US011910453B2

(12) United States Patent
Majmundar et al.

(10) Patent No.: US 11,910,453 B2
(45) Date of Patent: *Feb. 20, 2024

(54) MESH CONNECTIVITY BETWEEN NETWORK NODES IN HIERARCHICAL NETWORK

(71) Applicant: AT&T Intellectual Property I, L.P., Atlanta, GA (US)

(72) Inventors: Milap Majmundar, Austin, TX (US); Thomas Novlan, Cedar Park, TX (US); Xiaoyi Wang, Austin, TX (US); Salam Akoum, Austin, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 456 days.

This patent is subject to a terminal disclaimer.

(21) Appl. No.: 17/321,560

(22) Filed: May 17, 2021

(65) Prior Publication Data
US 2021/0274580 A1 Sep. 2, 2021

Related U.S. Application Data

(63) Continuation of application No. 16/418,958, filed on May 21, 2019, now Pat. No. 11,039,490.

(51) Int. Cl.
*H04W 76/14* (2018.01)
*H04W 4/70* (2018.01)
(Continued)

(52) U.S. Cl.
CPC ............ *H04W 76/14* (2018.02); *H04L 5/1469* (2013.01); *H04W 4/70* (2018.02); *H04W 4/80* (2018.02); *H04W 8/24* (2013.01); *H04W 84/18* (2013.01)

(58) Field of Classification Search
CPC ......... H04W 76/14; H04W 4/70; H04W 4/80; H04W 8/24; H04W 84/18; H04W 4/06;
(Continued)

(56) References Cited

U.S. PATENT DOCUMENTS

2016/0081131 A1* 3/2016 Walley ................. H04W 84/18
370/254
2019/0150134 A1* 5/2019 Kakinada .............. H04W 16/14
370/330
(Continued)

OTHER PUBLICATIONS

Lua, Eng Keong, et al. "A survey and comparison of peer-to-peer overlay network schemes." IEEE Communications Surveys & Tutorials 7.2 (2005): 72-93. (Year: 2005).*
(Continued)

*Primary Examiner* — Sharad Rampuria
(74) *Attorney, Agent, or Firm* — Guntin & Gust, PLC; Dana B. LeMoine

(57) ABSTRACT

Various embodiments disclosed herein provide for facilitating creating a mesh connectivity between network nodes in a hierarchical network. According an embodiment, a method comprising receiving a first condition, wherein the first condition indicates whether to setup a mesh connection with a first distributed unit node of a first node device. The method further comprising, in response to determining that the first condition indicates establishment of the mesh connection, facilitating establishing a peer-to-peer connection directly with the first distributed unit node of the first node device and a second distributed unit node of a second node device, wherein the first distributed unit node comprises wireless communication technologies and the second distributed unit node comprises wireless communication technologies. The method further comprising facilitating transmission of a control message or a user plane message in
(Continued)

order to exchange connection information between the first distributed unit node and the second distributed unit node.

17 Claims, 11 Drawing Sheets

(51) Int. Cl.
*H04W 4/80* (2018.01)
*H04L 5/14* (2006.01)
*H04W 8/24* (2009.01)
*H04W 84/18* (2009.01)

(58) Field of Classification Search
CPC ........... H04W 4/40; H04W 4/44; H04W 4/46; H04W 76/15; H04W 88/085; H04W 92/20; H04L 5/1469; H04L 5/0033; H04L 5/0023; H04L 5/0092
See application file for complete search history.

(56) References Cited

U.S. PATENT DOCUMENTS

2019/0166526 A1* 5/2019 Xu ....................... H04W 76/11
2019/0357117 A1 11/2019 Cudak et al.

OTHER PUBLICATIONS

Non-Final Office Action received for U.S. Appl. No. 16/418,958 dated Aug. 11, 2020, 18 pages.

* cited by examiner

MESH CONNECTIVITY BETWEEN NETWORK NODES IN HIERARCHICAL NETWORK

RELATED APPLICATION

The subject patent application is a continuation of, and claims priority to, U.S. patent application Ser. No. 16/418,958, filed May 21, 2019, and entitled "MESH CONNECTIVITY BETWEEN NETWORK NODES IN HIERARCHICAL NETWORK," the entirety of which application is hereby incorporated by reference herein.

TECHNICAL FIELD

This disclosure relates generally to a wireless communication system in general, and to a fifth generation (5G) wireless communication systems that utilizes a new radio (NR) technologies. More specifically, facilitating creating a mesh connectivity between network nodes in a hierarchical network.

BACKGROUND

5th generation (5G) wireless systems represent a next major phase of mobile telecommunications standards, also called new radio (NR) access, beyond the current telecommunications standards of $4^{th}$ generation (4G). In addition to faster peak Internet connection speeds, 5G planning aims at higher capacity than current 4G, allowing a higher number of mobile broadband users per area unit, and allowing consumption of higher or unlimited data quantities.

According to 3GPP NR-based 5G mobile networks, a split radio access network (RAN) protocol architecture can be employed such that on the user plane the packet data convergence protocol (PDCP) sublayers reside at a centralized unit (CU) node, while the radio link control (RLC), medium access control (MAC), and physical (PHY) layers reside at the distributed unit (DU) node. According to a hierarchical network, on the control plane, signaling radio bearers (SRBs), that carry control-plane information, are set up that carry control messages from the radio resource control (RRC) layer that also utilize the PDCP layer at the CU, and are further carried down through the RLC, MAC, and PHY layers at the DU to be delivered to the UE over the air interface. User plane data is carried (e.g., using user plane message) on data radio bearers (DRBs), that carry user plane data, that traverse the above described control plane RAN protocol architecture. Each network user can be allocated multiple DRBs and SRBs by the network. The network interface between the CU and DU is called the F1 interface. Although, the DU and CU may be physically separated, due to the hierarchical network architecture, the current design does not support a mesh connectivity between peer DU nodes.

The above-described background relating to facilitating creating a mesh connectivity between network nodes in a hierarchical network using NR technology is merely intended to provide a contextual overview of some current issues and is not intended to be exhaustive. Other contextual information may become further apparent upon review of the following detailed description.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

DETAILED DESCRIPTION

Figure 1:
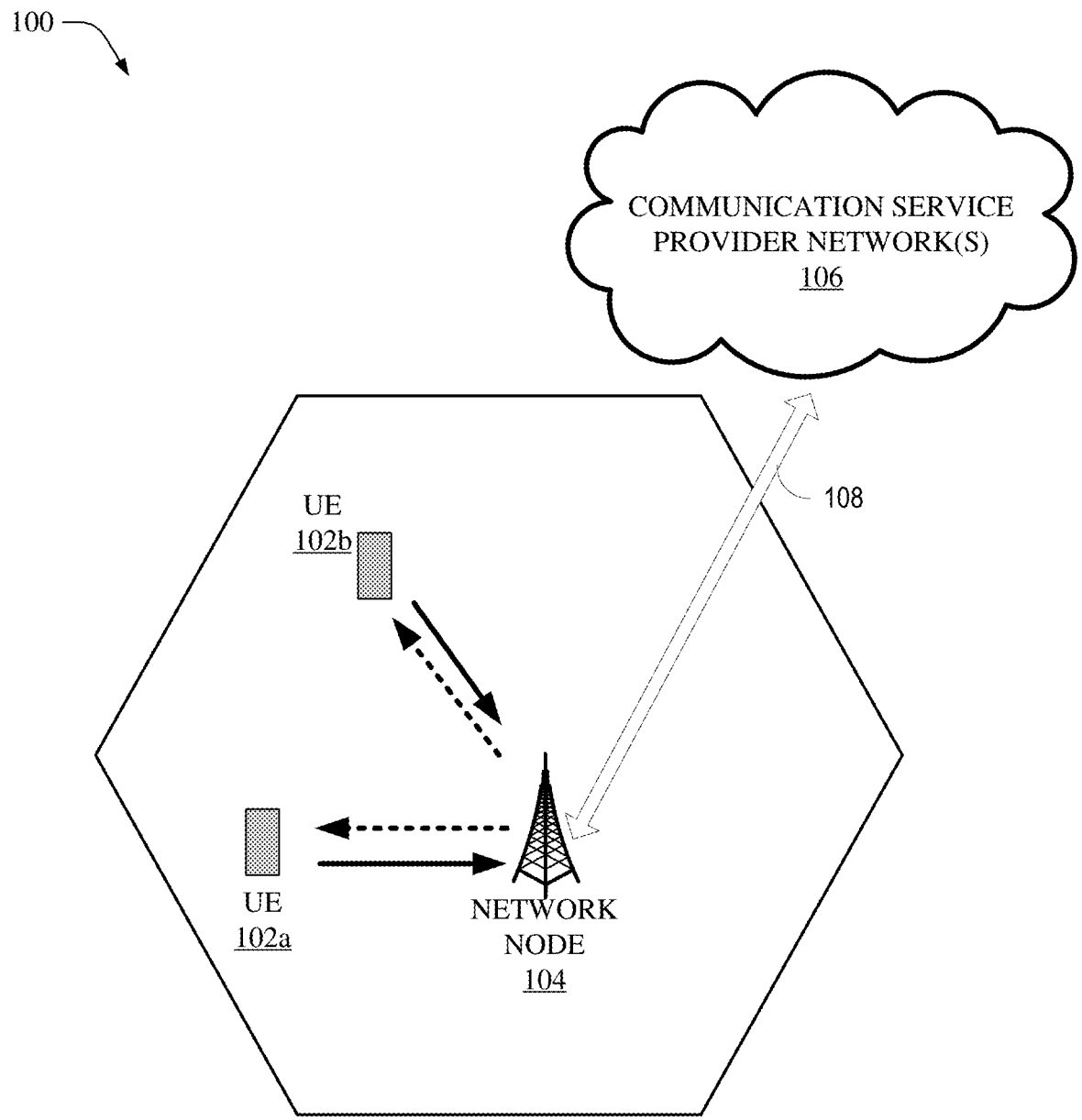
FIG. 1 illustrates a non-limiting example of a wireless communication system 100 in accordance with various aspects and embodiments of the subject disclosure.

In the following description, numerous specific details are set forth to provide a thorough understanding of various embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment," or "an embodiment," means that a particular feature, structure, or characteristic described in connection with the embodiment is included in at least one embodiment. Thus, the appearances of the phrase "in one embodiment," "in one aspect," or "in an embodiment," in various places throughout this specification are not necessarily all referring to the same embodiment. Furthermore, the particular features, structures, or characteristics may be combined in any suitable manner in one or more embodiments.

As utilized herein, terms "component," "system," "interface," and the like are intended to refer to a computer-related entity, hardware, software (e.g., in execution), and/or firmware. For example, a component can be a processor, a process running on a processor, an object, an executable, a program, a storage device, and/or a computer. By way of illustration, an application running on a server and the server can be a component. One or more components can reside within a process, and a component can be localized on one computer and/or distributed between two or more computers.

Further, these components can execute from various machine-readable media having various data structures stored thereon. The components can communicate via local and/or remote processes such as in accordance with a signal having one or more data packets (e.g., data from one component interacting with another component in a local system, distributed system, and/or across a network, e.g., the Internet, a local area network, a wide area network, etc. with other systems via the signal).

As another example, a component can be an apparatus with specific functionality provided by mechanical parts operated by electric or electronic circuitry; the electric or electronic circuitry can be operated by a software application or a firmware application executed by one or more processors; the one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components. In an aspect, a component can emulate an electronic component via a virtual machine, e.g., within a cloud computing system.

The words "exemplary" and/or "demonstrative" are used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

As used herein, the term "infer" or "inference" refers generally to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference can be employed to identify a specific context or action, or can generate a probability distribution over states of interest based on a consideration of data and events, for example.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

In addition, the disclosed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, machine-readable device, computer-readable carrier, computer-readable media, or machine-readable media. For example, computer-readable media can include, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media.

As an overview, various embodiments are described herein to facilitate creating a mesh connectivity between network nodes in a hierarchical network. For simplicity of explanation, the methods (or algorithms) are depicted and described as a series of acts. It is to be understood and appreciated that the various embodiments are not limited by the acts illustrated and/or by the order of acts. For example, acts can occur in various orders and/or concurrently, and with other acts not presented or described herein. Furthermore, not all illustrated acts may be required to implement the methods. In addition, the methods could alternatively be represented as a series of interrelated states via a state diagram or events. Additionally, the methods described hereafter are capable of being stored on an article of manufacture (e.g., a machine-readable storage medium) to facilitate transporting and transferring such methodologies to computers. The term article of manufacture, as used herein, is intended to encompass a computer program accessible from any computer-readable device, carrier, or media, including a non-transitory machine-readable storage medium.

It should be noted that although various aspects and embodiments have been described herein in the context of 5G, Universal Mobile Telecommunications System (UMTS), and/or Long Term Evolution (LTE), or other next generation networks, the disclosed aspects are not limited to 5G, a UMTS implementation, and/or an LTE implementation as the techniques can also be applied in 3G, 4G or LTE systems. For example, aspects or features of the disclosed embodiments can be exploited in substantially any wireless communication technology. Such wireless communication technologies can include UMTS, Code Division Multiple Access (CDMA), Wi-Fi, Worldwide Interoperability for Microwave Access (WiMAX), General Packet Radio Service (GPRS), Enhanced GPRS, Third Generation Partnership Project (3GPP), LTE, Third Generation Partnership Project 2 (3GPP2) Ultra Mobile Broadband (UMB), High Speed Packet Access (HSPA), Evolved High Speed Packet Access (HSPA+), High-Speed Downlink Packet Access (HSDPA), High-Speed Uplink Packet Access (HSUPA), Zigbee, or another IEEE 802.XX technology. Additionally, substantially all aspects disclosed herein can be exploited in legacy telecommunication technologies.

Described herein are systems, methods, articles of manufacture, and other embodiments or implementations that can facilitate creating a mesh connectivity between network nodes in a hierarchical network. Facilitating creating a mesh connectivity between network nodes in a hierarchical network can be implemented in connection with any type of device with a connection to the communications network (e.g., a mobile handset, a computer, a handheld device, etc.) any Internet of things (JOT) device (e.g., toaster, coffee maker, blinds, music players, speakers, etc.), and/or any connected vehicles (cars, airplanes, space rockets, and/or other at least partially automated vehicles (e.g., drones)). In some embodiments the non-limiting term user equipment (UE) is used. It can refer to any type of wireless device that communicates with a radio network node in a cellular or mobile communication system. In some embodiments, UE can refer to vehicle, pedestrian, or a mobile handset or any device that communicates with or without a network node. Examples of UE are target device, device to device (D2D) UE, machine type UE or UE capable of machine to machine (M2M) communication, vehicle to vehicle (V2V), vehicle to everything (V2X), PDA, Tablet, mobile terminals, smart phone, laptop embedded equipped (LEE), laptop mounted equipment (LME), USB dongles, etc. Note that the terms element, elements and antenna ports can be interchangeably used but carry the same meaning in this disclosure. The embodiments are applicable to single carrier as well as to multicarrier (MC) or carrier aggregation (CA) operation of the UE. The term carrier aggregation (CA) is also called (e.g., interchangeably called) "multi-carrier system", "multi-cell operation", "multi-carrier operation", "multi-carrier" transmission and/or reception.

In some embodiments the non-limiting term radio, network node, or simply network node is used. It can refer to any type of network node that serves UE is connected to other network nodes or network elements or any radio node from where UE receives a signal. Examples of radio network nodes are Node B, base station (BS), multi-standard radio (MSR) node such as MSR BS, eNode B, network controller, radio network controller (RNC), base station controller (BSC), relay, donor node controlling relay, base transceiver station (BTS), access point (AP), transmission points, transmission nodes, remote radio unit (RRU), remote radio head (RRH), nodes in distributed antenna system (DAS), relay device, network node, node device, etc.

Cloud radio access networks (RAN) can enable the implementation of concepts such as software-defined network (SDN) and network function virtualization (NFV) in 5G networks. This disclosure can facilitate a generic channel state information framework design for a 5G network. Certain embodiments of this disclosure can comprise an SDN controller that can control routing of traffic within the network and between the network and traffic destinations. The SDN controller can be merged with the 5G network architecture to enable service deliveries via open application programming interfaces ("APIs") and move the network core towards an all internet protocol ("IP"), cloud based, and software driven telecommunications network. The SDN controller can work with or take the place of policy and charging rules function ("PCRF") network elements so that policies such as quality of service and traffic management and routing can be synchronized and managed end to end.

Wireless local area networks (WLANs) have long been deployed in unlicensed spectrum bands. The IEEE 802.11 communications standard is an example of a communications system operating in these bands. A popular implementation thereof, for example, is Wi-Fi. Numerous versions of the Wi-Fi standard have been developed and deployed over the years such as 802.11a/b/g/n/ac/ax. One characteristic of this evolution is the ever-increasing bandwidth these communications standards can offer. For example, IEEE 802.11a started out with 20 MHz bandwidth whereby the latest generation, Wi-Fi 6 or 802.11ax, can access up to 160 MHz. The standards associated with Wi-Fi (e.g., all versions) define how devices can transmit using unlicensed spectrum. A device operating using Wi-Fi, first listens on the portion of the subband (e.g., a subbands of 20 MHz) until there is no traffic before transmitting using that subband (e.g., also referred to as "sensing" or "scanning"). The sensing before transmitting applies to transmission on both uplink and downlink. Sensing is a method for checking for energy on a given subband during a time-slot. In particular, an energy detection threshold is defined per said LBT subband and whether the medium is occupied or idle is determined per LBT subband based on whether the measurement results in a value larger or smaller than said detection threshold. If for a given subband, the threshold is exceeded, it is considered occupied or busy; otherwise it is considered idle (e.g., available to transmit for a predefined timeframes/timeslot, for example, ten timeslots).

As the LTE technology is advancing the resources employed for establishing communication, transmitting data or addition of reference signals causes the resource block to be adjusted. For the first generation of communication devices, a set of resources were reserved and set of resources were available for general use (e.g., communication of data, establishing communication, etc.). The network node device and/or central controller determined how the available resources would be employed. As the LTE technology advanced, the use of available resources may be controlled by the communication device for device to device communication. For LTE Rel-14 introduced a new mode that allowed communication device to establish the NR sidelink that did not need the assistance from the network. Thus, the communication devices determined how the available resources may be employed. This allowed communication devices to create a NR sidelink using the available resources. The problem occurs when new generation of communication devices enter the communication network. The new generation of communication devices may use certain available resources for specific purposes, thereby make those available resources unavailable. This situation, the collision may occur between the older version communication devices communicating with new generation communication devices. The NR sidelink, in some embodiments, may be used to establish a mess connectivity (e.g., direct device to device connection without the assistance from the network or use of hierarchical protocol requirement) between one or more DU.

According an embodiment, a system can comprise a processor and a memory that stores executable instructions that, when executed by the processor, facilitate performance of operations comprising receiving a first condition, wherein the first condition indicates whether to setup a mesh connection with a first distributed unit node of a first node device. The system can further facilitate in response to determining that the first condition indicates establishment of the mesh connection, facilitating establishing a peer-to-peer connection directly with the first distributed unit node of the first node device and a second distributed unit node of a second node device, wherein the first distributed unit node and the second distributed unit node comprise a wireless communication capability. The system can further facilitate facilitating transmission of a user plane message in order to exchange connection information between the first distributed unit node and the second distributed unit node.

According to another embodiment, described herein is a method that can comprise receiving, by a system comprising a processor, a first condition, wherein the first condition indicates whether to setup a mesh connection with a first distributed unit node of a first node device. The method can further comprise in response to determining that the first condition indicates establishment of the mesh connection, facilitating, by the system, establishing a device-to-device connection directly with the first distributed unit node of the first node device and a second distributed unit node of a second node device, wherein the first distributed unit node and the second distributed unit node communicate according to a wireless communication protocol. The method can further comprise facilitating, by the system, transmitting of a control message in order to exchange connection information between the first distributed unit node and the second distributed unit node.

According to yet another embodiment, machine-readable storage medium, comprising executable instructions that, when executed by a processor, facilitate performance of operations, receiving a first condition, wherein the first condition indicates whether to setup a mesh connection with a first distributed unit node of a first node device. The machine-readable storage medium can further comprise in response to determining that the first condition indicates establishment of the mesh connection, facilitating establishing a wireless connection directly with the first distributed unit node of the first node device and a second distributed unit node of a second node device, wherein the first distributed unit node and the second distributed unit node comprise a wireless communication technology. The machine-readable storage medium can further comprise, facilitating transmission of a control plane message and a user plane message in order to exchange connection information between the first distributed unit node and the second distributed unit node.

These and other embodiments or implementations are described in more detail below with reference to the drawings.

FIG. 1 illustrates a non-limiting example of a wireless communication system 100 in accordance with various aspects and embodiments of the subject disclosure. In one or more embodiments, system 100 can comprise one or more user equipment UEs (e.g., 102a and 102b and referred to as 102). The non-limiting term user equipment can refer to any type of device that can communicate with a network node in a cellular or mobile communication system. A UE can have one or more antenna panels having vertical and horizontal elements. Examples of a UE comprise a target device, device to device (D2D) UE, machine type UE or UE capable of machine to machine (M2M) communications, personal digital assistant (PDA), tablet, mobile terminals, smart phone, laptop mounted equipment (LME), universal serial bus (USB) dongles enabled for mobile communications, a computer having mobile capabilities, a mobile device such as cellular phone, a laptop having laptop embedded equipment (LEE, such as a mobile broadband adapter), a tablet computer having a mobile broadband adapter, a wearable device, a virtual reality (VR) device, a heads-up display (HUD) device, a smart car, a machine-type communication (MTC) device, and the like. User equipment UE 102 can also comprise IOT devices that communicate wirelessly.

In various embodiments, system 100 is or comprises a wireless communication network serviced by one or more wireless communication network providers. In example embodiments, a UE 102 can be communicatively coupled to the wireless communication network via a network node 104. The network node (e.g., network node device) can communicate with user equipment (UE), thus providing connectivity between the UE and the wider cellular network. The UE 102 can send transmission type recommendation data to the network node 104. The transmission type recommendation data can comprise a recommendation to transmit data via a closed loop MIMO mode and/or a rank-1 precoder mode.

A network node can have a cabinet and other protected enclosure, an antenna mast, and multiple antennas for performing various transmission operations (e.g., MIMO operations). Network nodes can serve several cells, also called sectors, depending on the configuration and type of antenna. In example embodiments, the UE 102 can send and/or receive communication data via a wireless link to the network node 104. The dashed arrow lines from the network node 104 to the UE 102 represent downlink (DL) communications and the solid arrow lines from the UE 102 to the network nodes 104 represents an uplink (UL) communication.

System 100 can further include one or more communication service provider networks 106 that facilitate providing wireless communication services to various UEs, including UE 102, via the network node 104 and/or various additional network devices (not shown) included in the one or more communication service provider networks 106. The one or more communication service provider networks 106 can include various types of disparate networks, including but not limited to: cellular networks, femto networks, picocell networks, microcell networks, internet protocol (IP) networks Wi-Fi service networks, broadband service network, enterprise networks, cloud based networks, millimeter wave networks and the like. For example, in at least one implementation, system 100 can be or include a large scale wireless communication network that spans various geographic areas. According to this implementation, the one or more communication service provider networks 106 can be or include the wireless communication network and/or various additional devices and components of the wireless communication network (e.g., additional network devices and cell, additional UEs, network server devices, etc.). The network node 104 can be connected to the one or more communication service provider networks 106 via one or more backhaul links 108. For example, the one or more backhaul links 108 can comprise wired link components, such as a T1/E1 phone line, a digital subscriber line (DSL) (e.g., either synchronous or asynchronous), an asymmetric DSL (ADSL), an optical fiber backbone, a coaxial cable, and the like. The one or more backhaul links 108 can also include wireless link components, such as but not limited to, line-of-sight (LOS) or non-LOS links which can include terrestrial air-interfaces or deep space links (e.g., satellite communication links for navigation).

Wireless communication system 100 can employ various cellular systems, technologies, and modulation modes to facilitate wireless radio communications between devices (e.g., the UE 102 and the network node 104). While example embodiments might be described for 5G new radio (NR) systems, the embodiments can be applicable to any radio access technology (RAT) or multi-RAT system where the UE operates using multiple carriers e.g. LTE FDD/TDD, GSM/GERAN, CDMA2000 etc.

For example, system 100 can operate in accordance with global system for mobile communications (GSM), universal mobile telecommunications service (UMTS), long term evolution (LTE), LTE frequency division duplexing (LTE FDD, LTE time division duplexing (TDD), high speed packet access (HSPA), code division multiple access (CDMA), wideband CDMA (WCMDA), CDMA2000, time division multiple access (TDMA), frequency division multiple access (FDMA), multi-carrier code division multiple access (MC-CDMA), single-carrier code division multiple access (SC-CDMA), single-carrier FDMA (SC-FDMA), orthogonal frequency division multiplexing (OFDM), discrete Fourier transform spread OFDM (DFT-spread OFDM) single carrier FDMA (SC-FDMA), Filter bank based multi-carrier (FBMC), zero tail DFT-spread-OFDM (ZT DFT-s-OFDM), generalized frequency division multiplexing (GFDM), fixed mobile convergence (FMC), universal fixed mobile convergence (UFMC), unique word OFDM (UW-OFDM), unique word DFT-spread OFDM (UW DFT-Spread-OFDM), cyclic prefix OFDM CP-OFDM, resource-block-filtered OFDM, Wi Fi, WLAN, WiMax, and the like.

However, various features and functionalities of system 100 are particularly described wherein the devices (e.g., the UEs 102 and the network device 104) of system 100 are configured to communicate wireless signals using one or more multi carrier modulation schemes, wherein data symbols can be transmitted simultaneously over multiple frequency subcarriers (e.g., OFDM, CP-OFDM, DFT-spread OFMD, UFMC, FMBC, etc.). The embodiments are applicable to single carrier as well as to multicarrier (MC) or carrier aggregation (CA) operation of the UE. The term carrier aggregation (CA) is also called (e.g. interchangeably called) "multi-carrier system", "multi-cell operation", "multi-carrier operation", "multi-carrier" transmission and/ or reception. Note that some embodiments are also applicable for Multi RAB (radio bearers) on some carriers (that is data plus speech is simultaneously scheduled).

In various embodiments, system 100 can be configured to provide and employ 5G wireless networking features and functionalities. 5G wireless communication networks are expected to fulfill the demand of exponentially increasing data traffic and to allow people and machines to enjoy gigabit data rates with virtually zero latency. Compared to 4G, 5G supports more diverse traffic scenarios. For example, in addition to the various types of data communication between conventional UEs (e.g., phones, smartphones, tablets, PCs, televisions, Internet enabled televisions, etc.) supported by 4G networks, 5G networks can be employed to support data communication between smart cars in association with driverless car environments, as well as machine type communications (MTCs). Considering the drastic different communication needs of these different traffic scenarios, the ability to dynamically configure waveform parameters based on traffic scenarios while retaining the benefits of multi carrier modulation schemes (e.g., OFDM and related schemes) can provide a significant contribution to the high speed/capacity and low latency demands of 5G networks. With waveforms that split the bandwidth into several sub-bands, different types of services can be accommodated in different sub-bands with the most suitable waveform and numerology, leading to an improved spectrum utilization for 5G networks.

To meet the demand for data centric applications, features of proposed 5G networks may comprise: increased peak bit rate (e.g., 20 Gbps), larger data volume per unit area (e.g., high system spectral efficiency—for example about 3.5 times that of spectral efficiency of long term evolution (LTE) systems), high capacity that allows more device connectivity both concurrently and instantaneously, lower battery/power consumption (which reduces energy and consumption costs), better connectivity regardless of the geographic region in which a user is located, a larger numbers of devices, lower infrastructural development costs, and higher reliability of the communications. Thus, 5G networks may allow for: data rates of several tens of megabits per second should be supported for tens of thousands of users, 1 gigabit per second to be offered simultaneously to tens of workers on the same office floor, for example; several hundreds of thousands of simultaneous connections to be supported for massive sensor deployments; improved coverage, enhanced signaling efficiency; reduced latency compared to LTE.

The upcoming 5G access network may utilize higher frequencies (e.g., >6 GHz) to aid in increasing capacity. Currently, much of the millimeter wave (mmWave) spectrum, the band of spectrum between 30 GHz and 300 GHz is underutilized. The millimeter waves have shorter wavelengths that range from 10 millimeters to 1 millimeter, and these mmWave signals experience severe path loss, penetration loss, and fading. However, the shorter wavelength at mmWave frequencies also allows more antennas to be packed in the same physical dimension, which allows for large-scale spatial multiplexing and highly directional beamforming.

Performance can be improved if both the transmitter and the receiver are equipped with multiple antennas. Multi-antenna techniques can significantly increase the data rates and reliability of a wireless communication system. The use of multiple input multiple output (MIMO) techniques, which was introduced in the third-generation partnership project (3GPP) and has been in use (including with LTE), is a multi-antenna technique that can improve the spectral efficiency of transmissions, thereby significantly boosting the overall data carrying capacity of wireless systems. The use of multiple-input multiple-output (MIMO) techniques can improve mmWave communications and has been widely recognized a potentially important component for access networks operating in higher frequencies. MIMO can be used for achieving diversity gain, spatial multiplexing gain and beamforming gain. For these reasons, MIMO systems are an important part of the 3rd and 4th generation wireless systems and are planned for use in 5G systems.

Figure 2A:
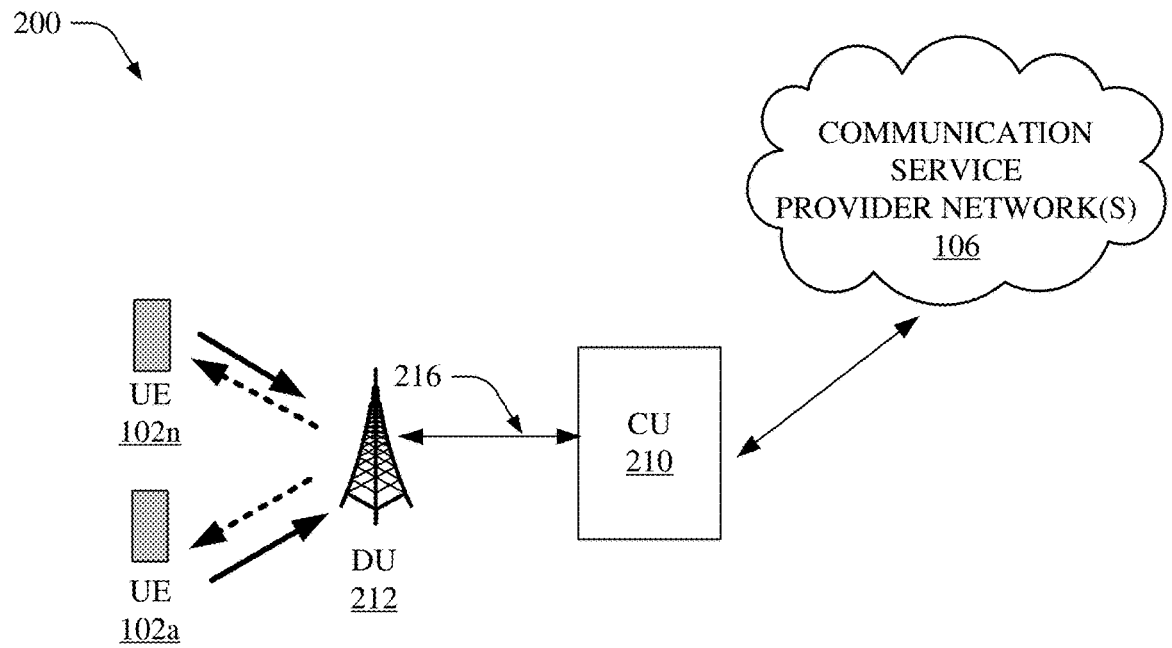
FIG. 2A, illustrates an example of basic NR RAN system in accordance with various aspects and embodiments described herein.

Referring now to FIG. 2A, illustrated is an example of basic NR RAN system 200 in accordance with various aspects and embodiments described herein. Repetitive description of like elements employed in other embodiments described herein is omitted for sake of brevity. In some embodiments, the system 200 comprises one or more UEs (e.g., 102a through 102n) and a distributed unit node 212 and a centralized unit node 210, wherein the centralized unit node in communicatively connected to the network 106. In some embodiments, the RLC, MAC, PHY and PDCP layers are split in manner such that the RLC, MAC and PHY layers are in distributed unit node and PDCP layer is operated by centralized unit 210. In some embodiments, an F1 interface 216 is employed to communicatively connect the DU node 212 and the CU node. In some embodiments, the control messages are carried from the RRC layer utilizing the PDCP layer at the CU 210, and are further carried down through the RLC, MAC, and PHY layers at the DU 216 to be delivered to the UE over the air interface.

Figure 2B:
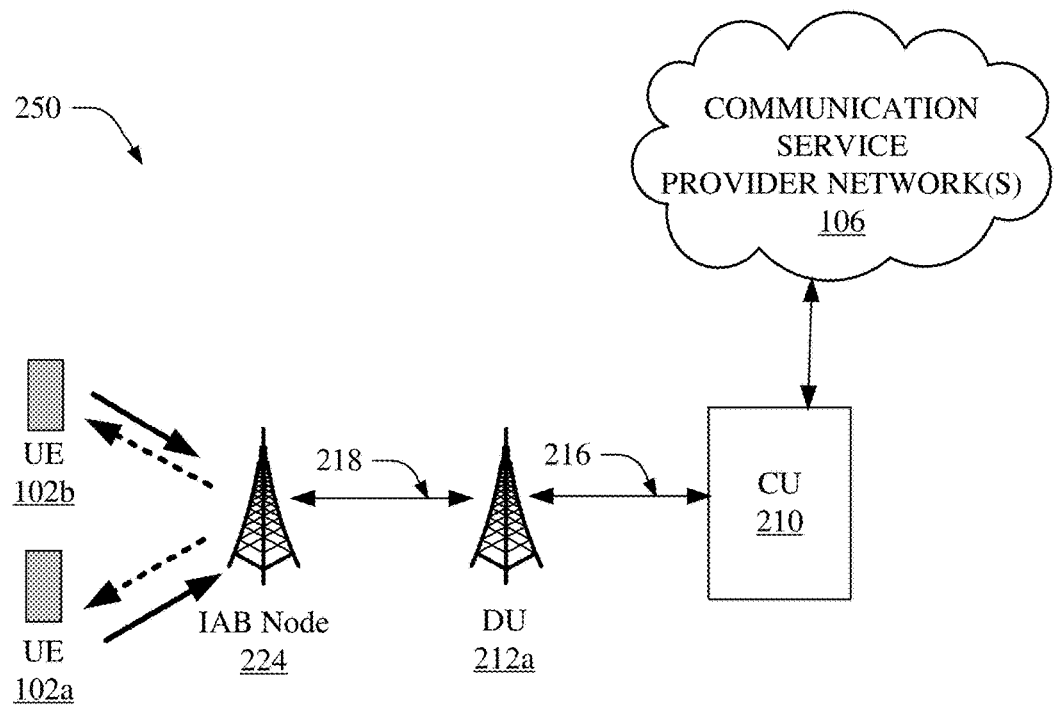
FIG. 2B, illustrates an example of a system comprising integrated access and backhaul links in accordance with various aspects and embodiments described herein.

Referring now to FIG. 2B, illustrated is an example of a system 250 comprising integrated access and backhaul (IAB) links in accordance with various aspects and embodiments described herein. Repetitive description of like elements employed in other embodiments described herein is omitted for sake of brevity. In some embodiments, a system 250 comprises an IAB node 224 that connected to a donor DU node 212a via an IAB link 218. In some embodiments, an integrated access and backhaul feature of 3GPP is utilized that is targeted to enable future cellular network deployment scenarios and applications to the support wireless backhaul and relay links enabling flexible and very dense deployment of NR cells without the need for densifying the transport network proportionately. Due to the expected larger bandwidth available for NR compared to LTE (e.g. mmWave spectrum) along with the native deployment of massive multiple-input-multiple-output (MIMO) or multi-beam systems in NR, the integrated access and backhaul links may be utilized. The use of IAB links 218 may allow easier deployment of a dense network of self-backhauled NR cells in a more integrated manner by building upon many of the control and data channels/procedures defined for providing access to UEs 102a-n. In some embodiments, an example illustration of a network with such integrated access and backhaul links is shown in system 250, where the IAB node 224 (relay node) can multiplex access and backhaul links in time, frequency, or space (e.g. beam-based operation). In some embodiments, the IAB relay links 218 are based on the Uu interface (e.g., LTE radio interface that allows data transfer from network node to UEs), IAB still maintains a hierarchical network architecture. Hence, only spanning tree (ST) or directed acyclic graph (DAG) topologies are supported such that there is a clear hierarchy from child IAB nodes to parent IAB node 224 to donor DU node 212a (e.g., IAB node comprising a distributed unit 212). The current IAB network design does not support mesh connectivity between peer IAB nodes. Thus, in some embodiments, utilizing the 3GPP NR technology that does support direct device-to-device (D2D) communications using the sidelink interface (PC5), an IAB nodes (e.g., 224 and 212a) a peer-to-peer sidelink with the IAB design to enable support for mesh connectivity in a hierarchical IAB network is described herein.

Figure 3A:
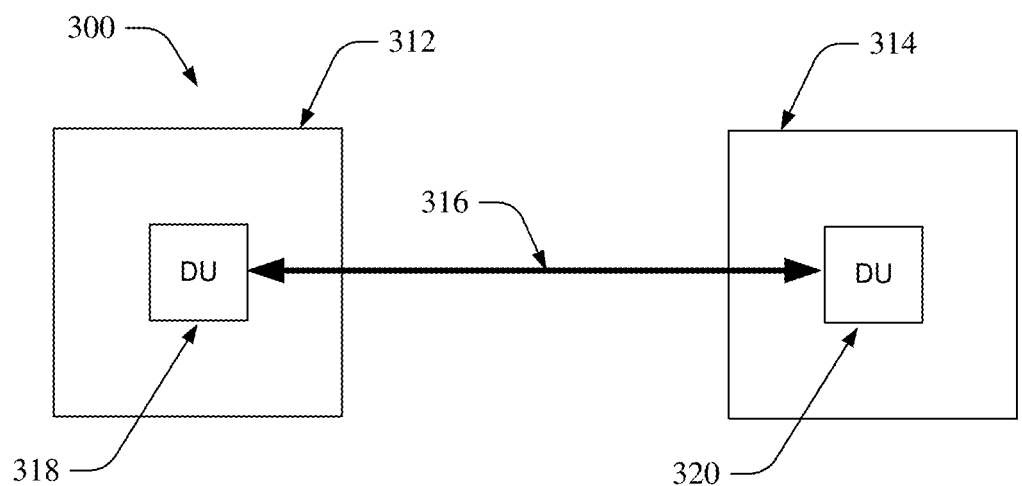
FIG. 3A illustrates an example of a system for establishing a mesh connectivity in accordance with various aspects and embodiments described herein.

Referring now to FIG. 3A, illustrated is an example of a system 300 for establishing a mesh connectivity in accordance with various aspects and embodiments described herein. Repetitive description of like elements employed in other embodiments described herein is omitted for sake of brevity. In some embodiments, the system 300 comprises an IAB node 312 comprising a distributed unit node 318 and an IAB node 314 comprising a distributed unit node 320. In some embodiments, a device-to-device connection (e.g., peer-to-peer connection) between distributed unit node 318 and distributed node 320 can be established employing a logical DU-to-DU interface 316. In some embodiments, the logical DU-to-DU interface 316 (e.g., the new interface or DU-DU interface) between peer DU's (e.g., 318 and 320) of IAB nodes 312 and 314, respectively, can be established to create a mesh connectivity across the IAB network comprising similar IAB nodes (not shown). Such mesh connectivity could be used for exchange of control data or user plane data directly between peer IAB nodes 312 and 314. In some embodiments, an inter-DU control message may be defined and transmitted over the DU-to-DU interface 316 to exchange control information between DUs of IAB nodes. In some embodiments, the control plane messages could be used to exchange information to coordinate, for example, dynamic TDD patterns, or cross-link interference (CLI) information, multi-hop scheduling metrics, or distributed routing information. In some embodiments, a direct peer-to-peer coordination would significantly reduce the amount of time required for two IAB nodes to communicate and coordinate with each other. In some embodiments, an inter-DU user plane messages are transmitted over this new interface to exchange user plane data directly between peer IAB nodes to enable peer-to-peer mesh networking across the IAB nodes without going through the donor IAB node. Note that since the current IAB design performs routing of packets across the IAB network at the backhaul adaptation protocol (BAP) layer controlled by the donor CU, this centrally controlled routing design may not be suitable for operation in a mesh topology. In some embodiments, a distributed mesh-based routing function can be provided at IAB nodes 312 and 314 to transmit data across the mesh network to different IAB nodes (not shown).

In some embodiments, in addition, the new interface may only apply to the exchange of inter-IAB node DU control messages or user data forwarding in specific instances (e.g. to support lossless transport during mobility or link blockage/failure events). In one example, the routing tables used by the BAP layer to determine the forwarding direction for the DU-DU interface packets may be separate from the routing tables used by the BAP layer for normal UE-associated or donor-associated control and data traffic. This is beneficial if the network uses different topologies to construct the connectivity graph for the DU-DU interface links vs. the regular backhaul links carrying regular UE-associated or donor-associated control and data traffic. Such a capability can be beneficial in scenarios where it may be more efficient to locally route control and data packets directly between IAB nodes rather than via the donor node. This may be the case where a group of IAB nodes are deployed to provide local connectivity service to a given area that is remote from the donor node, or even temporarily, for example in a disaster zone. In such a case, it is more efficient to transmit local traffic locally between peer IAB nodes.

An additional benefit may also be realized in scenarios where all or some of the IAB nodes are not fixed but mobile, where a hierarchical topology can be very inefficient due to significant overhead due to topology changes during mobility events, requiring signaling over multiple hops between the impacted nodes and the Donor CU to reconfigure the connectivity, routing tables, and backhaul mapping configurations. Furthermore, a mesh topology may coexist with a hierarchical ST or DAG topology, where only certain nodes (e.g. mobile IAB nodes) or certain traffic (e.g. only DU-DU control signaling) are carried over the DU-DU interface over the communication links defined by the mesh topology, with the remaining signaling carried over the existing backhaul links.

Figure 3B:
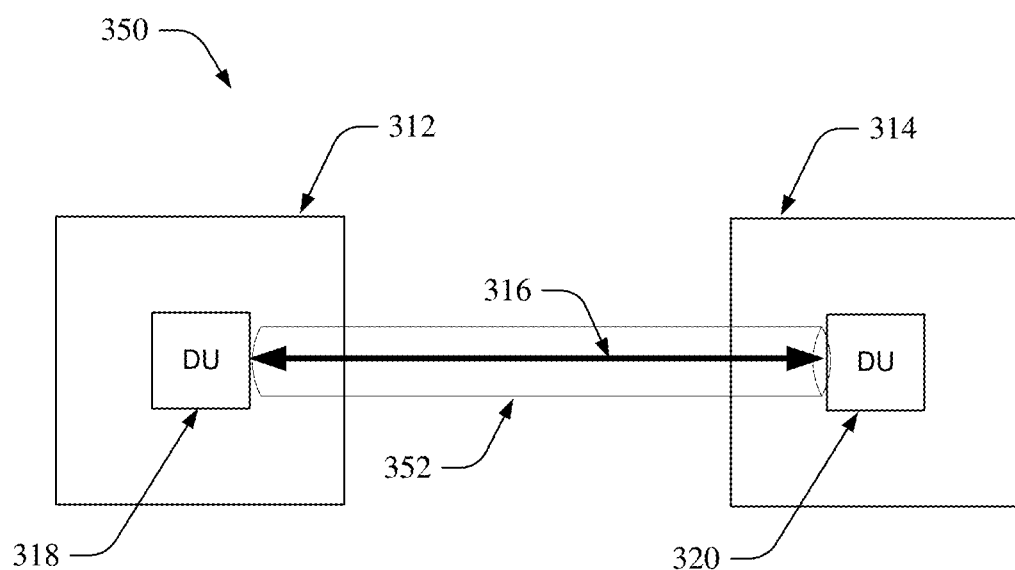
FIG. 3B illustrates an example of a system for establishing a mesh connectivity in accordance with various aspects and embodiments described herein.

Referring now to FIG. 3B, illustrated is an example of a system 350 for establishing a mesh connectivity in accordance with various aspects and embodiments described herein. Repetitive description of like elements employed in other embodiments described herein is omitted for sake of brevity. In some embodiments, a DU-to-DU sidelink interface 352 may be utilized to establish a peer-to-peer communication (e.g., DU-to-DU communication) 316. In some embodiments, the DU-to-DU sidelink 352 interface comprises the PC5 sidelink technology, or similar sidelink technology, for example, but not limited to vehicle to vehicle (V2V), vehicle to everything (V2X), that does not require use of the network node to communicate with other devices. In some embodiments, the logical DU-to-DU interface 352 may be use the DU-to-DU sidelink 352 to transport (e.g., exchange) control and data messages directly between peer DUs (e.g., 312 and 314).

Figure 4A:
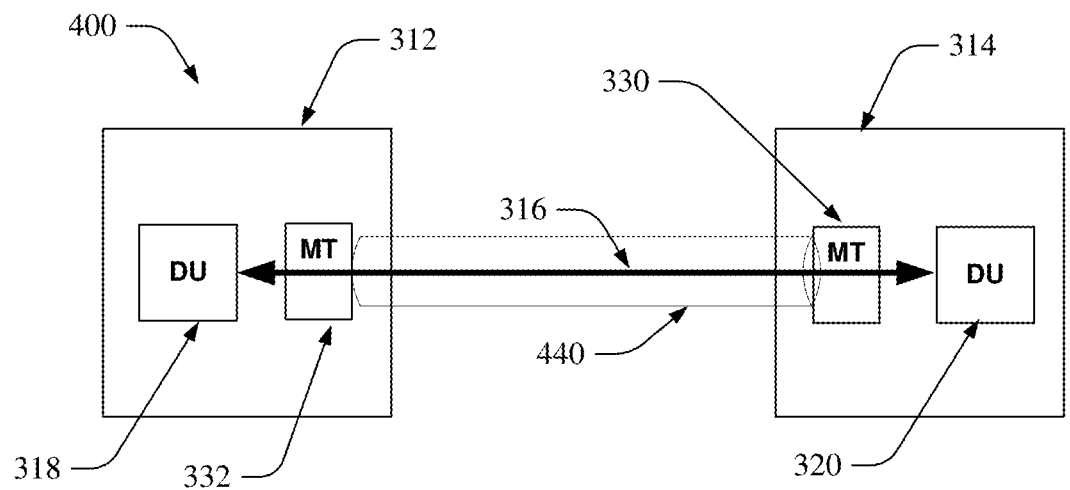
FIG. 4A illustrates an example of a system for establishing a mesh connectivity in accordance with various aspects and embodiments described herein.

Referring now to FIG. 4A, illustrated is an example of a system 400 for establishing a mesh connectivity in accordance with various aspects and embodiments described herein. Repetitive description of like elements employed in other embodiments described herein is omitted for sake of brevity. In some embodiments, the IAB node 312 further comprises a first intermediate unit 332 and the IAB node 314 further comprises a second intermediate unit 330. The first intermediate unit 330 is communicatively connected to the DU node 318 and the second intermediate unit 332 is communicatively connected to the DU node 320. In some embodiments, a sidelink interface 440 may be utilized to establish a peer-to-peer communication (e.g., DU-to-DU communication) 316 employing the intermediate units 330 and 332. In some embodiments, the sidelink interface 440 comprises the PC5 sidelink technology, or similar sidelink technology, for example, but not limited to vehicle to vehicle (V2V), vehicle to everything (V2X), that does not require use of the network node to communicate with other devices. In some embodiments, the logical DU-to-DU interface 352 may be use the DU-to-DU sidelink 352 to transport (e.g., exchange) control and data messages directly between peer DUs (e.g., 312 and 314).

Figure 10:
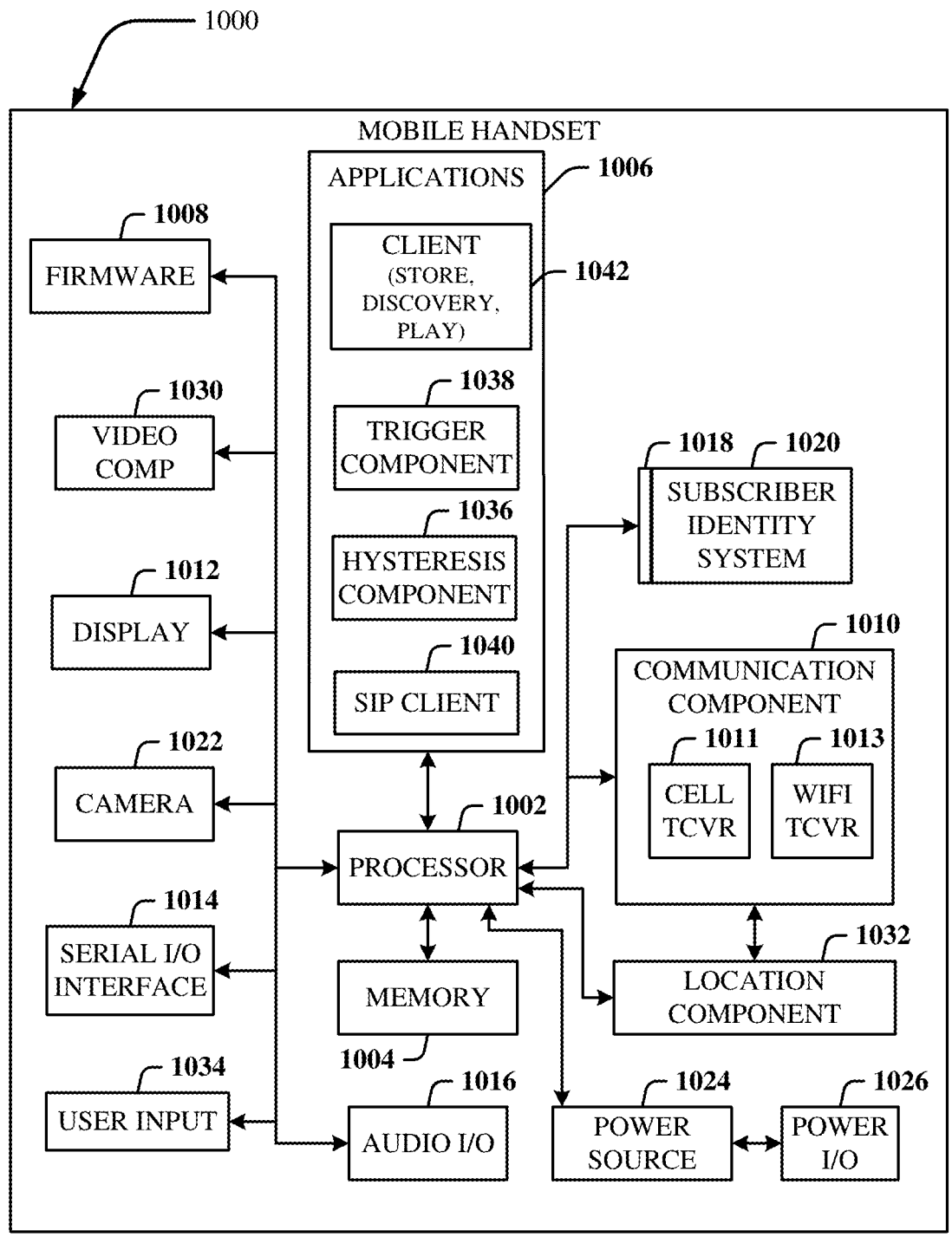
FIG. 10 illustrates an example block diagram of an example mobile handset operable to engage in a system architecture that facilitates wireless communications according to one or more embodiments described herein.

In some embodiments, the intermediate unit may comprise mobile terminal (MT) technology (e.g., mobile terminal functions or technology used in UE for establishing communication as shown in FIG. 10). The MT technology allows the establishment of the sidelink 352 between the two intermediate units, 330 and 332. According some embodiments, the MT functions of the intermediate units (e.g., 330 and 332), at the IAB nodes (e.g., 312 and 314), operates as a UE over the Uu interface, the MT functionalities facilitate enablement of PC5 sidelink operation. The control and data messages of the logical DU-DU interface can be tunneled through the PC5 sidelink between MTs (330 and 332) of peer IAB nodes (312 and 314). Note that since PC5 supports broadcast and multicast communication in addition to unicast communication, it may be possible that an IAB node DU (e.g., 312 and 314 comprising DU 318 and 320, respectively) can send the control and/or data messages to multiple IAB nodes via broadcast or multicast messages which may be more efficient than unicast communication.

Figure 4B:
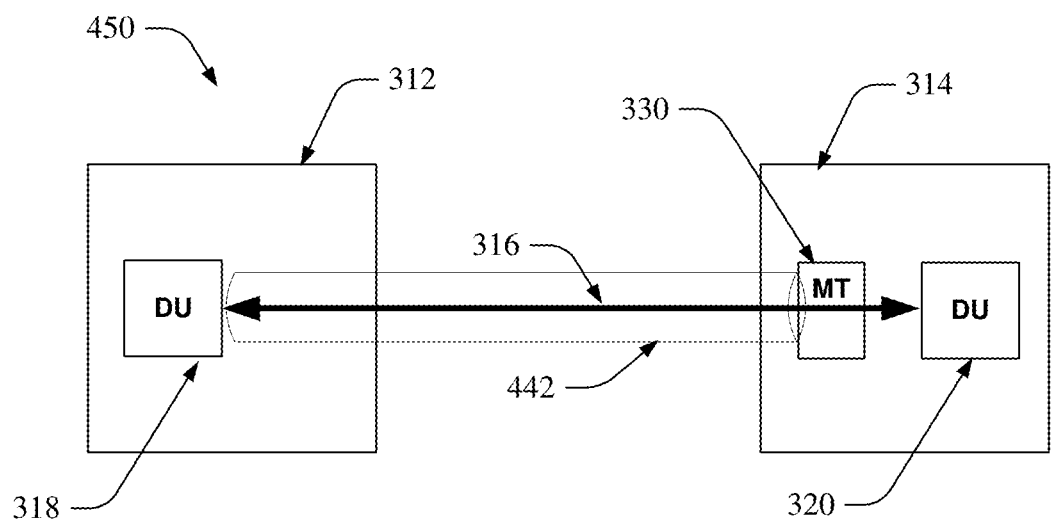
FIG. 4B illustrates an example of a system for establishing a mesh connectivity in accordance with various aspects and embodiments described herein.

Referring now to FIG. 4B, illustrated is an example of a system 450 for establishing a mesh connectivity in accordance with various aspects and embodiments described herein. Repetitive description of like elements employed in other embodiments described herein is omitted for sake of brevity. In some embodiments, not all the IAB nodes comprise the intermediate unit. In some embodiments, a sidelink interface 442 may be utilized to establish a peer-to-peer communication (e.g., DU-to-DU communication) 316 employing the intermediate units 330. In some embodiments, the sidelink interface 442 utilizes an IAB RLC backhaul channel to establish a link (e.g., DU-to-MT) between the DU 318 and MT 330. In some embodiments, the logical DU-to-DU interface 316 can operate over the Uu interface between the MT of one IAB node (e.g., 314) and DU of a peer IAB node (e.g., DU 318 of IAB node 312). Note that in the existing IAB design facilitates backhauled data transmission over the MT-DU Uu link between peer IAB nodes using RLC backhaul channels. IAB RLC backhaul channels are designed to transport IP packets encapsulated at the BAP layer. In some embodiments, the logical DU-DU interface messages utilize this IP layer above BAP layer to transport data and control messages between peer IAB DUs. In some embodiments, a mechanism is provided that facilitate receiving at the MT 330 to determine that the received packet is related to the logical DU-DU interface 316, as opposed to normal IAB backhaul traffic. In some embodiments, an indication can be provided using, for example, a traffic class field value in the IPv6 packet header.

Figure 5:
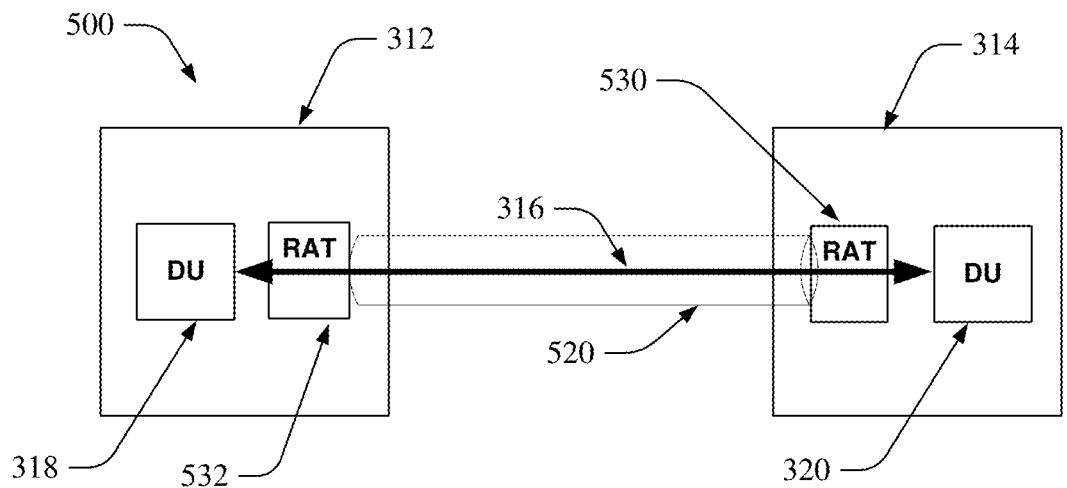
FIG. 5 illustrates an example of a system for establishing a mesh connectivity in accordance with various aspects and embodiments described herein.

Referring now to FIG. 5, illustrated is an example of a system 500 for establishing a mesh connectivity in accordance with various aspects and embodiments described herein. Repetitive description of like elements employed in other embodiments described herein is omitted for sake of brevity. In some embodiments, the IAB node 312 comprises a first intermediate unit 532 and the IAB node 314 comprises a second intermediate unit 530. The first intermediate unit 330 is communicatively connected to the DU node 318 and the second intermediate unit 332 is communicatively connected to the DU node 320. In some embodiments, a sidelink interface 520 may be utilized to establish a peer-to-peer communication (e.g., DU-to-DU communication) 316 employing the intermediate units 530 and 532. In some embodiments, the logical DU-to-DU interface 316 can also be made to operate over a non-3GPP RAT interface (e.g., short-range wireless technology may comprise, for example, but not limited to Wi-Fi, Bluetooth, near field communication, microwave, backhaul wireless technology or the like), where the peer IAB nodes are so equipped. In this case, the non-3GPP RAT operates as an IP-based transport to communicate control and data messages for the logical DU-DU interface 316.

The advantage of the systems described herein are that the systems enable a mesh connectivity between peer IAB nodes in an otherwise hierarchical IAB network. In addition, allows direct exchange of control information between peer IAB nodes to coordinate, for example, dynamic TDD patterns, or cross-link interference (CLI) information, or distributed routing information. Such direct peer-to-peer coordination could help significantly reduce the amount of time required for two IAB nodes to communicate and coordinate with each other. The system can further allow direct exchange of user plane data between peer IAB nodes without going through the donor IAB node. Such a capability can be beneficial in scenarios where it may be more efficient to locally route control and data packets directly between IAB nodes rather than via the donor node. This may be the case where a group of IAB nodes are deployed to provide local connectivity service to a given area that is remote from the donor node, or even temporarily, for example in a disaster zone. In such a case, it may be more efficient to transmit local traffic locally between peer IAB nodes. The system can also be beneficial in the scenario where all or some of the IAB nodes are not fixed but mobile, where a hierarchical topology can be very inefficient due to significant overhead due to topology changes during mobility events, requiring signaling over multiple hops between the impacted nodes and the Donor CU to reconfigure the connectivity, routing tables, and backhaul mapping configurations. This invention allows a mesh topology to coexist with a hierarchical ST or DAG topology, where only certain nodes (e.g. mobile IAB nodes) or certain traffic (e.g. only DU-DU control signaling) are carried over the DU-DU interface over the communication links defined by the mesh topology, with the remaining signaling carried over the existing backhaul links.

Figure 6:
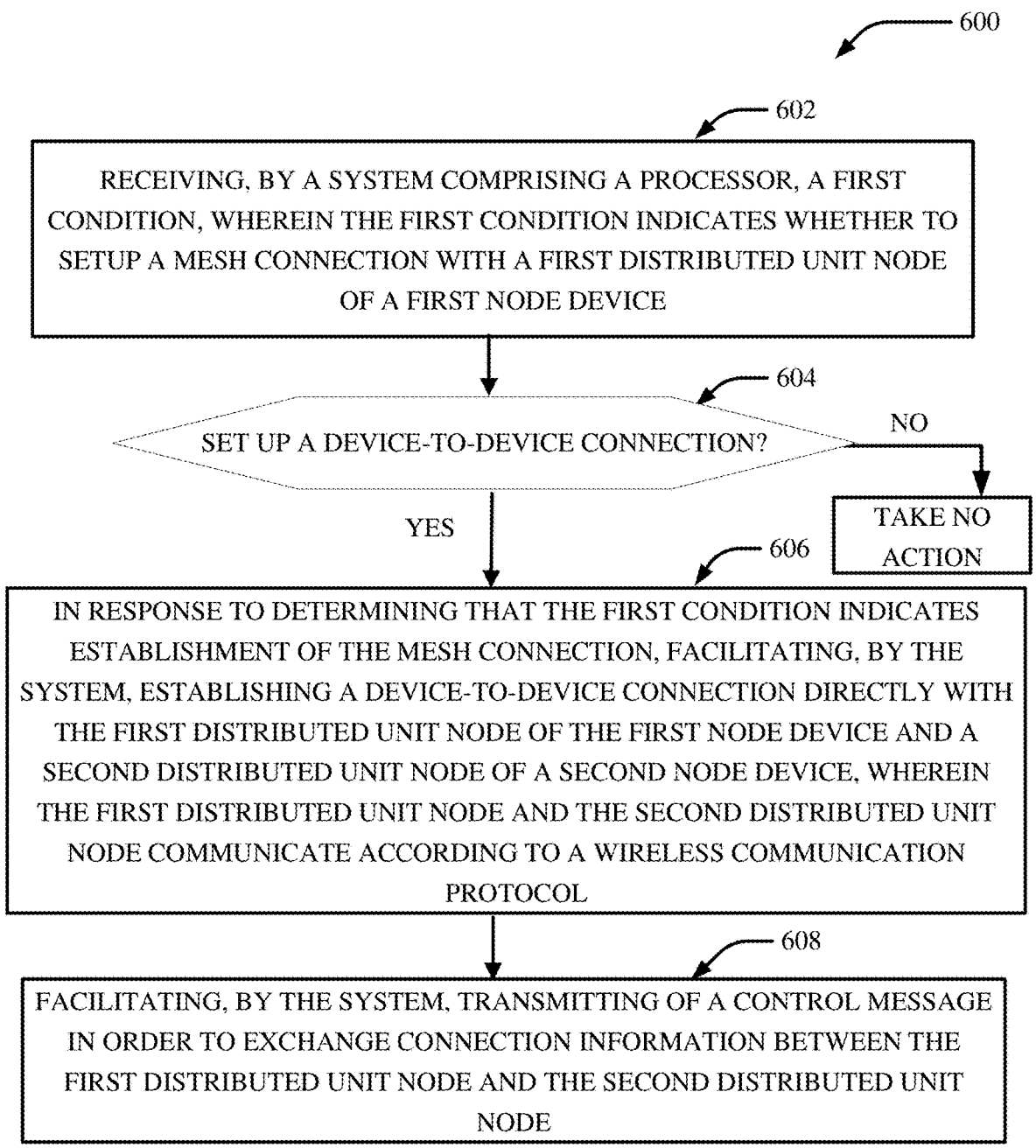
FIG. 6 depicts a diagram of an example, non-limiting computer implemented method that facilitates creating a mesh connectivity between network nodes in a hierarchical network in accordance with one or more embodiments described herein.

FIG. 6 depicts a diagram of an example, non-limiting computer implemented method that facilitates creating a mesh connectivity between network nodes in a hierarchical network in accordance with one or more embodiments described herein. Repetitive description of like elements employed in other embodiments described herein is omitted for sake of brevity. In some examples, flow diagram 600 can be implemented by operating environment 1100 described below. It can be appreciated that the operations of flow diagram 600 can be implemented in a different order than is depicted.

In non-limiting example embodiments, a computing device (or system) (e.g., computer 1100) is provided, the device or system comprising one or more processors and one or more memories that stores executable instructions that, when executed by the one or more processors, can facilitate performance of the operations as described herein, including the non-limiting methods as illustrated in the flow diagrams of FIG. 6.

Operation 602 depicts receiving, by a system comprising a processor, a first condition, wherein the first condition indicates whether to setup a mesh connection with a first distributed unit node of a first node device. Operation 606 depicts determining if the first condition indicates a request to set up a device-to-device (e.g., peer-to-peer or mesh network) connection, then perform operation 606. Otherwise, continue monitoring and take no action to set a mesh connection. Operation 606 depicts in response to determining that the first condition indicates establishment of the mesh connection, facilitating, by the system, establishing a device-to-device connection directly with the first distributed unit node of the first node device and a second distributed unit node of a second node device, wherein the first distributed unit node and the second distributed unit node communicate according to a wireless communication protocol. Operation 608 depicts facilitating, by the system, transmission of a control message in order to exchange connection information between the first distributed unit node and the second distributed unit node.

Figure 7:
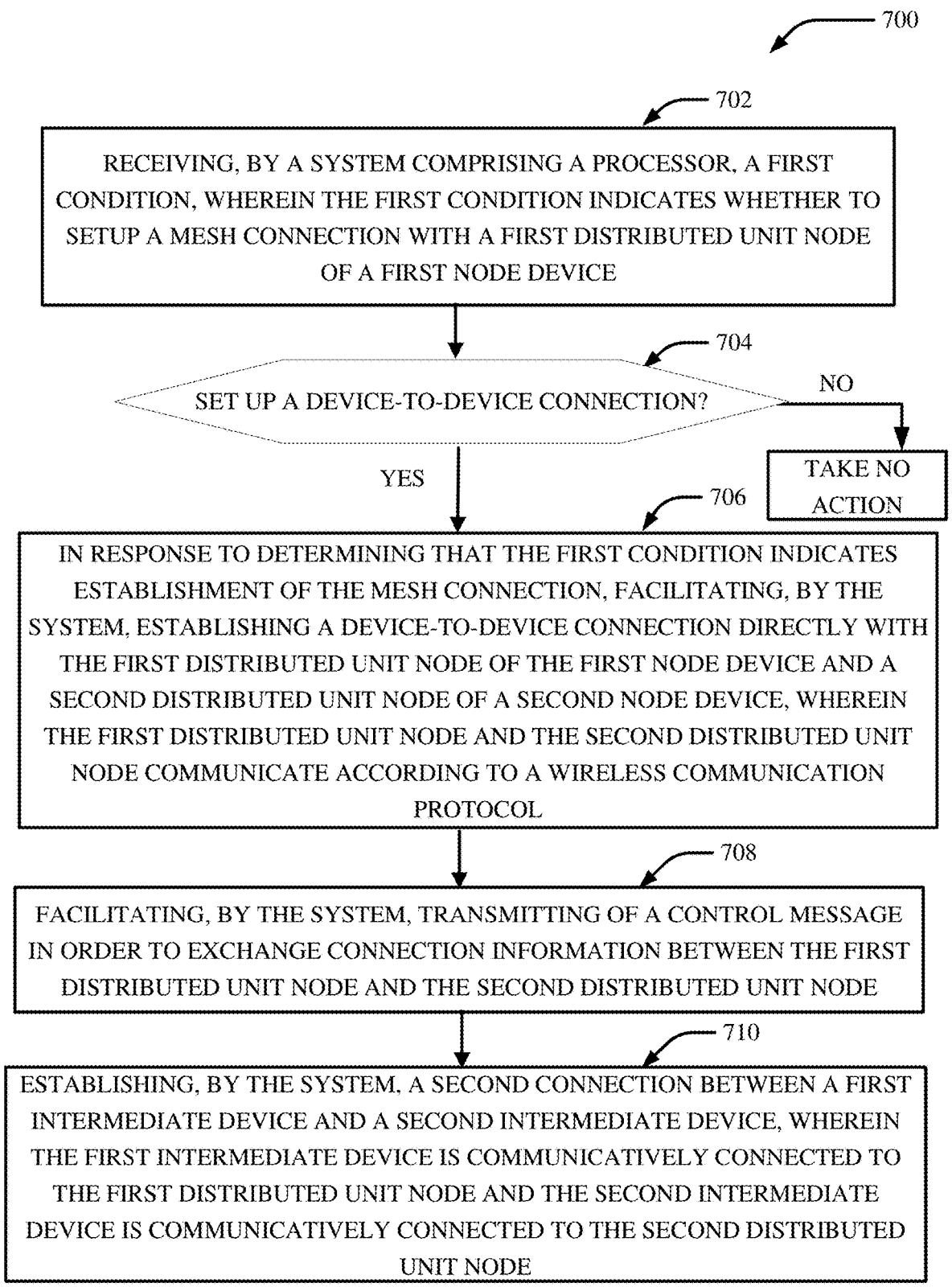
FIG. 7 depicts a diagram of an example, non-limiting computer implemented method that facilitates creating a mesh connectivity between network nodes in a hierarchical network in accordance with one or more embodiments described herein.

FIG. 7 depicts a diagram of an example, non-limiting computer implemented method that facilitates creating a mesh connectivity between network nodes in a hierarchical network in accordance with one or more embodiments described herein. Repetitive description of like elements employed in other embodiments described herein is omitted for sake of brevity. In some examples, flow diagram 700 can be implemented by operating environment 1100 described below. It can be appreciated that the operations of flow diagram 700 can be implemented in a different order than is depicted.

In non-limiting example embodiments, a computing device (or system) (e.g., computer 1100) is provided, the device or system comprising one or more processors and one or more memories that stores executable instructions that, when executed by the one or more processors, can facilitate performance of the operations as described herein, including the non-limiting methods as illustrated in the flow diagrams of FIG. 7.

Operation 702 depicts receiving, by a system comprising a processor, a first condition, wherein the first condition indicates whether to setup a mesh connection with a first distributed unit node of a first node device. Operation 706 depicts determining if the first condition indicates a request to set up a device-to-device (e.g., peer-to-peer or mesh network) connection, then perform operation 706. Otherwise, continue monitoring and take no action to set a mesh connection. Operation 706 depicts in response to determining that the first condition indicates establishment of the mesh connection, facilitating, by the system, establishing a device-to-device connection directly with the first distributed unit node of the first node device and a second distributed unit node of a second node device, wherein the first distributed unit node and the second distributed unit node communicate according to a wireless communication protocol. Operation 708 depicts facilitating, by the system, transmission of a control message in order to exchange connection information between the first distributed unit node and the second distributed unit node. Operation 710 depicts establishing, by the system, a second connection between a first intermediate device and a second intermediate device, wherein the first intermediate device is communicatively connected to the first distributed unit node and the second intermediate device is communicatively connected to the second distributed unit node.

Figure 8:
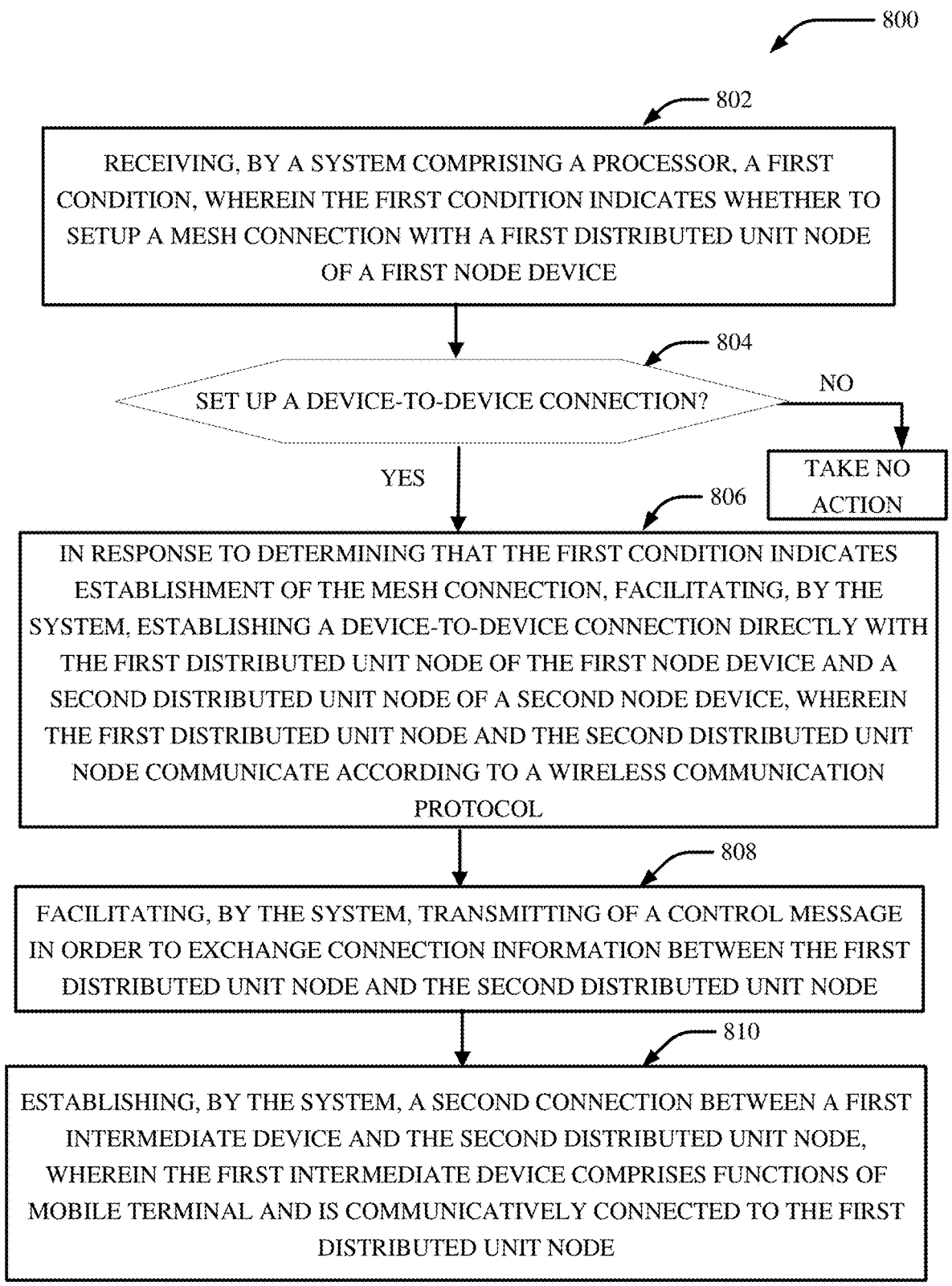
FIG. 8 depicts a diagram of an example, non-limiting computer implemented method that facilitates creating a mesh connectivity between network nodes in a hierarchical network in accordance with one or more embodiments described herein.

FIG. 8 depicts a diagram of an example, non-limiting computer implemented method that facilitates creating a mesh connectivity between network nodes in a hierarchical network in accordance with one or more embodiments described herein. Repetitive description of like elements employed in other embodiments described herein is omitted for sake of brevity. In some examples, flow diagram 800 can be implemented by operating environment 1100 described below. It can be appreciated that the operations of flow diagram 800 can be implemented in a different order than is depicted.

In non-limiting example embodiments, a computing device (or system) (e.g., computer 1100) is provided, the device or system comprising one or more processors and one or more memories that stores executable instructions that, when executed by the one or more processors, can facilitate performance of the operations as described herein, including the non-limiting methods as illustrated in the flow diagrams of FIG. 8.

Operation 802 depicts receiving, by a system comprising a processor, a first condition, wherein the first condition indicates whether to setup a mesh connection with a first distributed unit node of a first node device. Operation 806 depicts determining if the first condition indicates a request to set up a device-to-device (e.g., peer-to-peer or mesh network) connection, then perform operation 806. Otherwise, continue monitoring and take no action to set a mesh connection. Operation 806 depicts in response to determining that the first condition indicates establishment of the mesh connection, facilitating, by the system, establishing a device-to-device connection directly with the first distributed unit node of the first node device and a second distributed unit node of a second node device, wherein the first distributed unit node and the second distributed unit node communicate according to a wireless communication protocol. Operation 808 depicts facilitating, by the system, transmission of a control message in order to exchange connection information between the first distributed unit node and the second distributed unit node. Operation 810 depicts establishing, by the system, a second connection between a first intermediate device and the second distributed unit node, wherein the first intermediate device comprises functions of mobile terminal and is communicatively connected to the first distributed unit node.

Figure 9:
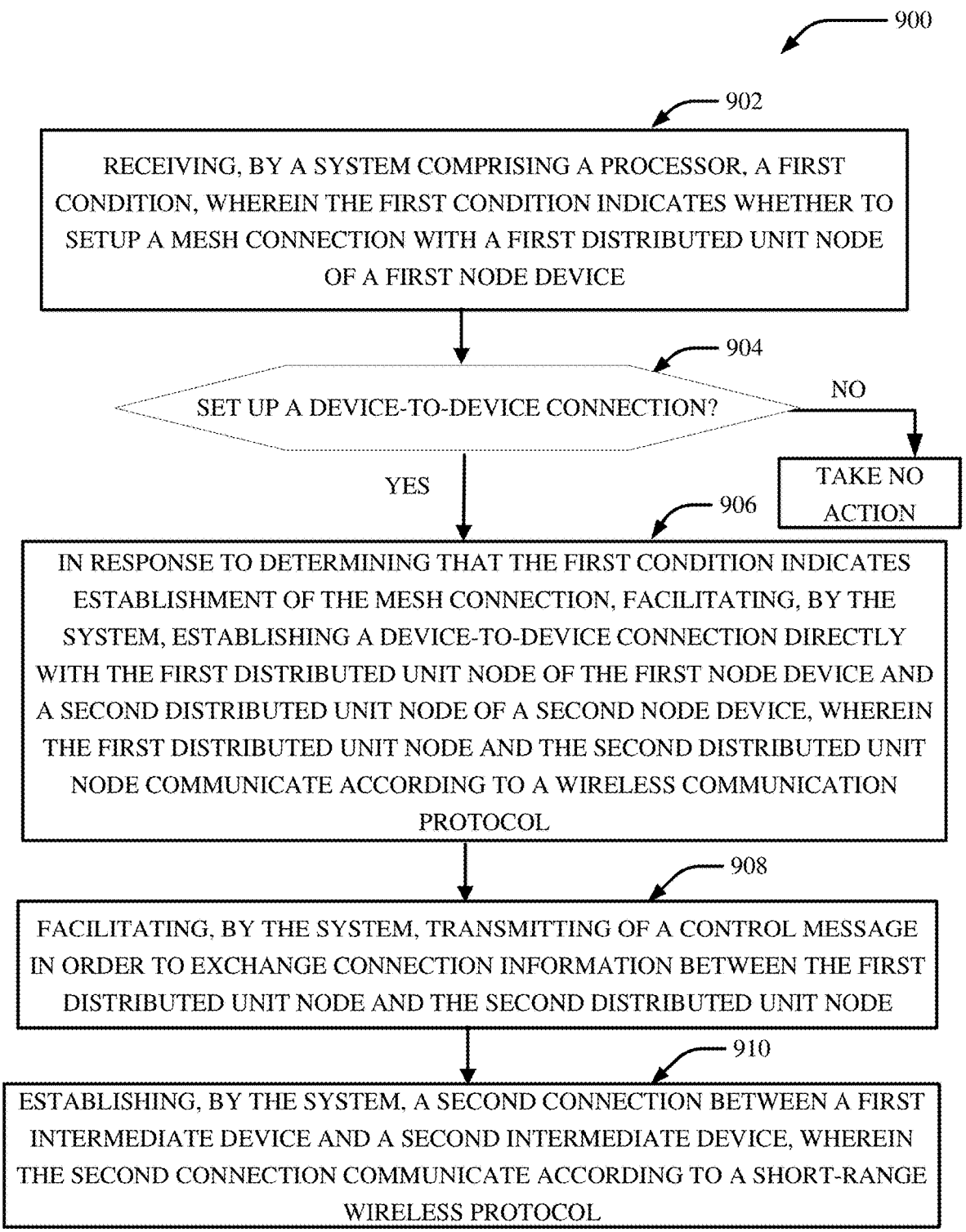
FIG. 9 depicts a diagram of an example, non-limiting computer implemented method that facilitates creating a mesh connectivity between network nodes in a hierarchical network in accordance with one or more embodiments described herein.

FIG. 9 depicts a diagram of an example, non-limiting computer implemented method that facilitates creating a mesh connectivity between network nodes in a hierarchical network in accordance with one or more embodiments described herein. Repetitive description of like elements employed in other embodiments described herein is omitted for sake of brevity. In some examples, flow diagram 900 can be implemented by operating environment 1100 described below. It can be appreciated that the operations of flow diagram 900 can be implemented in a different order than is depicted.

In non-limiting example embodiments, a computing device (or system) (e.g., computer 1100) is provided, the device or system comprising one or more processors and one or more memories that stores executable instructions that, when executed by the one or more processors, can facilitate performance of the operations as described herein, including the non-limiting methods as illustrated in the flow diagrams of FIG. 9.

Operation 902 depicts receiving, by a system comprising a processor, a first condition, wherein the first condition indicates whether to setup a mesh connection with a first distributed unit node of a first node device. Operation 906 depicts determining if the first condition indicates a request to set up a device-to-device (e.g., peer-to-peer or mesh network) connection, then perform operation 906. Otherwise, continue monitoring and take no action to set a mesh connection. Operation 906 depicts in response to determining that the first condition indicates establishment of the mesh connection, facilitating, by the system, establishing a device-to-device connection directly with the first distributed unit node of the first node device and a second distributed unit node of a second node device, wherein the first distributed unit node and the second distributed unit node communicate according to a wireless communication protocol. Operation 908 depicts facilitating, by the system, transmission of a control message in order to exchange connection information between the first distributed unit node and the second distributed unit node. Operation 910 establishing, by the system, a second connection between a first intermediate device and a second intermediate device, wherein the second connection communicate according to a short-range wireless protocol.

Referring now to FIG. 10, illustrated is an example block diagram of an example mobile handset 1000 operable to engage in a system architecture that facilitates wireless communications according to one or more embodiments described herein. Although a mobile handset is illustrated herein, it will be understood that other devices can be a mobile device, and that the mobile handset is merely illustrated to provide context for the embodiments of the various embodiments described herein. The following discussion is intended to provide a brief, general description of an example of a suitable environment in which the various embodiments can be implemented. While the description includes a general context of computer-executable instructions embodied on a machine-readable storage medium, those skilled in the art will recognize that the innovation also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of machine-readable media. Machine-readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules, or other data. Computer storage media can include, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The handset includes a processor 1002 for controlling and processing all onboard operations and functions. A memory 1004 interfaces to the processor 1002 for storage of data and one or more applications 1006 (e.g., a video player software, user feedback component software, etc.). Other applications can include voice recognition of predetermined voice commands that facilitate initiation of the user feedback signals. The applications 1006 can be stored in the memory 1004 and/or in a firmware 1008 and executed by the processor 1002 from either or both the memory 1004 or/and the firmware 1008. The firmware 1008 can also store startup code for execution in initializing the handset 1000. A communications component 1010 interfaces to the processor 1002 to facilitate wired/wireless communication with external systems, e.g., cellular networks, VoIP networks, and so on. Here, the communications component 1010 can also include a suitable cellular transceiver 1011 (e.g., a GSM transceiver) and/or an unlicensed transceiver 1013 (e.g., Wi-Fi, WiMax) for corresponding signal communications. The handset 1000 can be a device such as a cellular telephone, a PDA with mobile communications capabilities, and messaging-centric devices. The communications component 1010 also facilitates communications reception from terrestrial radio networks (e.g., broadcast), digital satellite radio networks, and Internet-based radio services networks.

The handset 1000 includes a display 1012 for displaying text, images, video, telephony functions (e.g., a Caller ID function), setup functions, and for user input. For example, the display 1012 can also be referred to as a "screen" that can accommodate the presentation of multimedia content (e.g., music metadata, messages, wallpaper, graphics, etc.). The display 1012 can also display videos and can facilitate the generation, editing and sharing of video quotes. A serial I/O interface 1014 is provided in communication with the processor 1002 to facilitate wired and/or wireless serial communications (e.g., USB, and/or IEEE 1394) through a hardwire connection, and other serial input devices (e.g., a keyboard, keypad, and mouse). This can support updating and troubleshooting the handset 1000, for example. Audio capabilities are provided with an audio I/O component 1016, which can include a speaker for the output of audio signals related to, for example, indication that the user pressed the proper key or key combination to initiate the user feedback signal. The audio I/O component 1016 also facilitates the input of audio signals through a microphone to record data and/or telephony voice data, and for inputting voice signals for telephone conversations.

The handset 1000 can include a slot interface 1018 for accommodating a SIC (Subscriber Identity Component) in the form factor of a card Subscriber Identity Module (SIM) or universal SIM 1020 and interfacing the SIM card 1020 with the processor 1002. However, it is to be appreciated that the SIM card 1020 can be manufactured into the handset 1000 and updated by downloading data and software.

The handset 1000 can process IP data traffic through the communications component 1010 to accommodate IP traffic from an IP network such as, for example, the Internet, a corporate intranet, a home network, a person area network, etc., through an ISP or broadband cable provider. Thus, VoIP traffic can be utilized by the handset 1000 and IP-based multimedia content can be received in either an encoded or decoded format.

A video processing component 1022 (e.g., a camera) can be provided for decoding encoded multimedia content. The video processing component 1022 can aid in facilitating the generation, editing, and sharing of video quotes. The handset 1000 also includes a power source 1024 in the form of batteries and/or an AC power subsystem, which power source 1024 can interface to an external power system or charging equipment (not shown) by a power I/O component 1026.

The handset 1000 can also include a video component 1030 for processing video content received and, for recording and transmitting video content. For example, the video component 1030 can facilitate the generation, editing and sharing of video quotes. A location tracking component 1032 facilitates geographically locating the handset 1000. As described hereinabove, this can occur when the user initiates the feedback signal automatically or manually. A user input component 1034 facilitates the user initiating the quality feedback signal. The user input component 1034 can also facilitate the generation, editing and sharing of video quotes. The user input component 1034 can include such conventional input device technologies such as a keypad, keyboard, mouse, stylus pen, and/or touchscreen, for example.

Referring again to the applications 1006, a hysteresis component 1036 facilitates the analysis and processing of hysteresis data, which is utilized to determine when to associate with the access point. A software trigger component 1038 can be provided that facilitates triggering of the hysteresis component 1036 when the Wi-Fi transceiver 1013 detects the beacon of the access point. A SIP client 1040 enables the handset 1000 to support SIP protocols and register the subscriber with the SIP registrar server. The applications 1006 can also include a client 1042 that provides at least the capability of discovery, play and store of multimedia content, for example, music.

The handset 1000, as indicated above related to the communications component 1010, includes an indoor network radio transceiver 1013 (e.g., Wi-Fi transceiver). This function supports the indoor radio link, such as IEEE 802.11, for the dual-mode GSM handset 1000. The handset 1000 can accommodate at least satellite radio services through a handset that can combine wireless voice and digital radio chipsets into a single handheld device.

Figure 11:
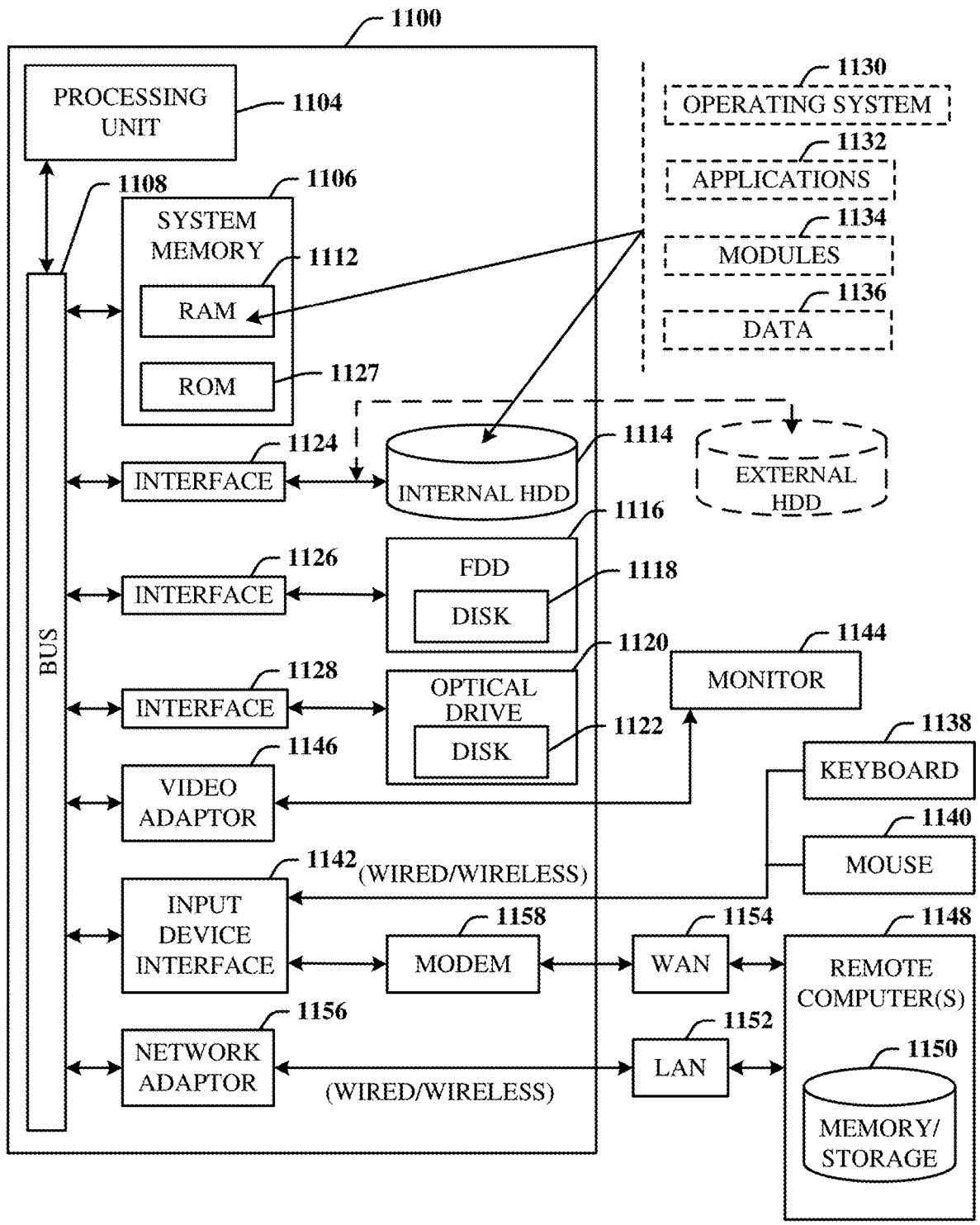
FIG. 11 illustrates an example block diagram of an example computer operable to engage in a system architecture that facilitates wireless communications according to one or more embodiments described herein.

Referring now to FIG. 11, illustrated is an example block diagram of an example computer 1100 operable to engage in a system architecture that facilitates wireless communications according to one or more embodiments described herein. The computer 1100 can provide networking and communication capabilities between a wired or wireless communication network and a server (e.g., Microsoft server) and/or communication device. In order to provide additional context for various aspects thereof, FIG. 11 and the following discussion are intended to provide a brief, general description of a suitable computing environment in which the various aspects of the innovation can be implemented to facilitate the establishment of a transaction between an entity and a third party. While the description above is in the general context of computer-executable instructions that can run on one or more computers, those skilled in the art will recognize that the innovation also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the innovation can also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media can embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference to FIG. 11, implementing various aspects described herein with regards to the end-user device can include a computer 1100, the computer 1100 including a processing unit 1104, a system memory 1106 and a system bus 1108. The system bus 1108 couples system components including, but not limited to, the system memory 1106 to the processing unit 1104. The processing unit 1104 can be any of various commercially available processors. Dual microprocessors and other multi-processor architectures can also be employed as the processing unit 1104.

The system bus 1108 can be any of several types of bus structure that can further interconnect to a memory bus (with or without a memory controller), a peripheral bus, and a local bus using any of a variety of commercially available bus architectures. The system memory 1106 includes read-only memory (ROM) 1127 and random access memory (RAM) 1112. A basic input/output system (BIOS) is stored in a non-volatile memory 1127 such as ROM, EPROM, EEPROM, which BIOS contains the basic routines that help to transfer information between elements within the computer 1100, such as during start-up. The RAM 1112 can also include a high-speed RAM such as static RAM for caching data.

The computer 1100 further includes an internal hard disk drive (HDD) 1114 (e.g., EIDE, SATA), which internal hard disk drive 1114 can also be configured for external use in a suitable chassis (not shown), a magnetic floppy disk drive (FDD) 1116, (e.g., to read from or write to a removable diskette 1118) and an optical disk drive 1120, (e.g., reading a CD-ROM disk 1122 or, to read from or write to other high capacity optical media such as the DVD). The hard disk drive 1114, magnetic disk drive 1116 and optical disk drive 1120 can be connected to the system bus 1108 by a hard disk drive interface 1124, a magnetic disk drive interface 1126 and an optical drive interface 1128, respectively. The interface 1124 for external drive implementations includes at least one or both of Universal Serial Bus (USB) and IEEE 1394 interface technologies. Other external drive connection technologies are within contemplation of the subject innovation.

The drives and their associated computer-readable media provide nonvolatile storage of data, data structures, computer-executable instructions, and so forth. For the computer 1100 the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer 1100, such as zip drives, magnetic cassettes, flash memory cards, cartridges, and the like, can also be used in the exemplary operating environment, and further, that any such media can contain computer-executable instructions for performing the methods of the disclosed innovation.

A number of program modules can be stored in the drives and RAM 1112, including an operating system 1130, one or more application programs 1132, other program modules 1134 and program data 1136. All or portions of the operating system, applications, modules, and/or data can also be cached in the RAM 1112. It is to be appreciated that the innovation can be implemented with various commercially available operating systems or combinations of operating systems.

A user can enter commands and information into the computer 1100 through one or more wired/wireless input devices, e.g., a keyboard 1138 and a pointing device, such as a mouse 1140. Other input devices (not shown) can include a microphone, an IR remote control, a joystick, a game pad, a stylus pen, touchscreen, or the like. These and other input devices are often connected to the processing unit 1104 through an input device interface 1142 that is coupled to the system bus 1108, but can be connected by other interfaces, such as a parallel port, an IEEE 1394 serial port, a game port, a USB port, an IR interface, etc.

A monitor 1144 or other type of display device is also connected to the system bus 1108 through an interface, such as a video adapter 1146. In addition to the monitor 1144, a computer 1100 typically includes other peripheral output devices (not shown), such as speakers, printers, etc.

The computer 1100 can operate in a networked environment using logical connections by wired and/or wireless communications to one or more remote computers, such as a remote computer(s) 1148. The remote computer(s) 1148 can be a workstation, a server computer, a router, a personal computer, portable computer, microprocessor-based entertainment device, a peer device or other common network node, and typically includes many or all of the elements described relative to the computer, although, for purposes of brevity, only a memory/storage device 1150 is illustrated. The logical connections depicted include wired/wireless connectivity to a local area network (LAN) 1152 and/or larger networks, e.g., a wide area network (WAN) 1154. Such LAN and WAN networking environments are commonplace in offices and companies, and facilitate enterprise-wide computer networks, such as intranets, all of which can connect to a global communications network, e.g., the Internet.

When used in a LAN networking environment, the computer 1100 is connected to the local network 1152 through a wired and/or wireless communication network interface or adapter 1156. The adapter 1156 can facilitate wired or wireless communication to the LAN 1152, which can also include a wireless access point disposed thereon for communicating with the wireless adapter 1156.

When used in a WAN networking environment, the computer 1100 can include a modem 1158, or is connected to a communications server on the WAN 1154, or has other means for establishing communications over the WAN 1154, such as by way of the Internet. The modem 1158, which can be internal or external and a wired or wireless device, is connected to the system bus 1108 through the input device interface 1142. In a networked environment, program modules depicted relative to the computer, or portions thereof, can be stored in the remote memory/storage device 1150. It will be appreciated that the network connections shown are exemplary and other means of establishing a communications link between the computers can be used.

The computer is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 9 Mbps (802.11a) or 54 Mbps (802.11b) data rate, for example, or with products that contain both bands (dual band), so the networks can provide real-world performance similar to the basic 16BaseT wired Ethernet networks used in many offices.

An aspect of 5G, which differentiates from previous 4G systems, is the use of NR. NR architecture can be designed to support multiple deployment cases for independent configuration of resources used for RACH procedures. Since the NR can provide additional services than those provided by LTE, efficiencies can be generated by leveraging the pros and cons of LTE and NR to facilitate the interplay between LTE and NR, as discussed herein.

Reference throughout this specification to "one embodiment," or "an embodiment," means that a particular feature, structure, or characteristic described in connection with the embodiment is included in at least one embodiment. Thus, the appearances of the phrase "in one embodiment," "in one aspect," or "in an embodiment," in various places throughout this specification are not necessarily all referring to the same embodiment. Furthermore, the particular features, structures, or characteristics can be combined in any suitable manner in one or more embodiments.

As used in this disclosure, in some embodiments, the terms "component," "system," "interface," and the like are intended to refer to, or comprise, a computer-related entity or an entity related to an operational apparatus with one or more specific functionalities, wherein the entity can be either hardware, a combination of hardware and software, software, or software in execution, and/or firmware. As an example, a component can be, but is not limited to being, a process running on a processor, a processor, an object, an executable, a thread of execution, computer-executable instructions, a program, and/or a computer. By way of illustration and not limitation, both an application running on a server and the server can be a component.

One or more components can reside within a process and/or thread of execution and a component can be localized on one computer and/or distributed between two or more computers. In addition, these components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software application or firmware application executed by one or more processors, wherein the processor can be internal or external to the apparatus and can execute at least a part of the software or firmware application. As yet another example, a component can be an apparatus that provides specific functionality through electronic components without mechanical parts, the electronic components can comprise a processor therein to execute software or firmware that confer(s) at least in part the functionality of the electronic components. In an aspect, a component can emulate an electronic component via a virtual machine, e.g., within a cloud computing system. While various components have been illustrated as separate components, it will be appreciated that multiple components can be implemented as a single component, or a single component can be implemented as multiple components, without departing from example embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or." That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "mobile device equipment," "mobile station," "mobile," subscriber station," "access terminal," "terminal," "handset," "communication device," "mobile device" (and/or terms representing similar terminology) can refer to a wireless device utilized by a subscriber or mobile device of a wireless communication service to receive or convey data, control, voice, video, sound, gaming or substantially any data-stream or signaling-stream. The foregoing terms are utilized interchangeably herein and with reference to the related drawings. Likewise, the terms "access point (AP)," "Base Station (BS)," BS transceiver, BS device, cell site, cell site device, "Node B (NB)," "evolved Node B (eNode B)," "home Node B (HNB)" and the like, are utilized interchangeably in the application, and refer to a wireless network component or appliance that transmits and/or receives data, control, voice, video, sound, gaming or substantially any data-stream or signaling-stream from one or more subscriber stations. Data and signaling streams can be packetized or frame-based flows.

Furthermore, the terms "device," "communication device," "mobile device," "subscriber," "customer entity," "consumer," "customer entity," "entity" and the like are employed interchangeably throughout, unless context warrants particular distinctions among the terms. It should be appreciated that such terms can refer to human entities or automated components supported through artificial intelligence (e.g., a capacity to make inference based on complex mathematical formalisms), which can provide simulated vision, sound recognition and so forth.

Embodiments described herein can be exploited in substantially any wireless communication technology, comprising, but not limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Z-Wave, Zigbee and other 802.XX wireless technologies and/or legacy telecommunication technologies.

The various aspects described herein can relate to New Radio (NR), which can be deployed as a standalone radio access technology or as a non-standalone radio access technology assisted by another radio access technology, such as Long Term Evolution (LTE), for example. It should be noted that although various aspects and embodiments have been described herein in the context of 5G, Universal Mobile Telecommunications System (UMTS), and/or Long Term Evolution (LTE), or other next generation networks, the disclosed aspects are not limited to 5G, a UMTS implementation, and/or an LTE implementation as the techniques can also be applied in 3G, 4G, or LTE systems. For example, aspects or features of the disclosed embodiments can be exploited in substantially any wireless communication technology. Such wireless communication technologies can include UMTS, Code Division Multiple Access (CDMA), Wi-Fi, Worldwide Interoperability for Microwave Access (WiMAX), General Packet Radio Service (GPRS), Enhanced GPRS, Third Generation Partnership Project (3GPP), LTE, Third Generation Partnership Project 2 (3GPP2) Ultra Mobile Broadband (UMB), High Speed Packet Access (HSPA), Evolved High Speed Packet Access (HSPA+), High-Speed Downlink Packet Access (HSDPA), High-Speed Uplink Packet Access (HSUPA), Zigbee, or another IEEE 802.XX technology. Additionally, substantially all aspects disclosed herein can be exploited in legacy telecommunication technologies.

As used herein, "5G" can also be referred to as NR access. Accordingly, systems, methods, and/or machine-readable storage media for facilitating link adaptation of downlink control channel for 5G systems are desired. As used herein, one or more aspects of a 5G network can comprise, but is not limited to, data rates of several tens of megabits per second (Mbps) supported for tens of thousands of users; at least one gigabit per second (Gbps) to be offered simultaneously to tens of users (e.g., tens of workers on the same office floor); several hundreds of thousands of simultaneous connections supported for massive sensor deployments; spectral efficiency significantly enhanced compared to 4G; improvement in coverage relative to 4G; signaling efficiency enhanced compared to 4G; and/or latency significantly reduced compared to LTE.

Systems, methods and/or machine-readable storage media for facilitating a two-stage downlink control channel for 5G systems are provided herein. Legacy wireless systems such as LTE, Long-Term Evolution Advanced (LTE-A), High Speed Packet Access (HSPA) etc. use fixed modulation format for downlink control channels. Fixed modulation format implies that the downlink control channel format is always encoded with a single type of modulation (e.g., quadrature phase shift keying (QPSK)) and has a fixed code rate. Moreover, the forward error correction (FEC) encoder uses a single, fixed mother code rate of 1/3 with rate matching. This design does not take into the account channel statistics. For example, if the channel from the BS device to the mobile device is very good, the control channel cannot use this information to adjust the modulation, code rate, thereby unnecessarily allocating power on the control channel. Similarly, if the channel from the BS to the mobile device is poor, then there is a probability that the mobile device might not able to decode the information received with only the fixed modulation and code rate. As used herein, the term "infer" or "inference" refers generally to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference can be employed to identify a specific context or action, or can generate a probability distribution over states of interest based on a consideration of data and events, for example.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification procedures and/or systems (e.g., support vector machines, neural networks, expert systems, Bayesian belief networks, fuzzy logic, and data fusion engines) can be employed in connection with performing automatic and/or inferred action in connection with the disclosed subject matter.

In addition, the various embodiments can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, machine-readable device, computer-readable carrier, computer-readable media, machine-readable media, computer-readable (or machine-readable) storage/communication media. For example, computer-readable media can comprise, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media. Of course, those skilled in the art will recognize many modifications can be made to this configuration without departing from the scope or spirit of the various embodiments The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the subject matter has been described herein in connection with various embodiments and corresponding figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A system, comprising:
a processor; and
a memory that stores executable instructions that, when executed by the processor, facilitate performance of operations, comprising:
in response to determining to setup a mesh connection with a first distributed unit node of first integrated access and backhaul node equipment serving a first user equipment, facilitating establishing a peer-to-peer wireless connection directly between the first distributed unit node of the first integrated access and backhaul node equipment and a second distributed unit node of second integrated access and backhaul node equipment serving a second user equipment other than the first user equipment; and
transmitting a user plane message between the first distributed unit node and the second distributed unit node via the peer-to-peer wireless connection to exchange connection information;
wherein the peer-to-peer wireless connection is a first connection, and the operations further comprise:
establishing a second connection between a first intermediate unit and
a second intermediate unit,
wherein the second connection employs a short-range wireless communication protocol, and
wherein the first intermediate unit is communicatively wired to the first distributed unit node.

2. The system of claim 1, wherein the peer-to-peer wireless connection is a first connection, and the operations further comprise:
establishing a second connection between a first intermediate unit and the second distributed unit node, wherein the first intermediate unit comprises functions of a mobile terminal and is communicatively connected to the first distributed unit node.

3. The system of claim 1, wherein the user plane message comprises a distributed unit control plane message, and wherein the distributed unit control plane message comprises cross-link interference information.

4. The system of claim 1, wherein the user plane message comprises a distributed unit control plane message, and wherein the distributed unit control plane message comprises a time division duplexing pattern.

5. The system of claim 1, wherein the user plane message comprises a distributed unit control plane message, and wherein the distributed unit control plane message comprises a multi-hop scheduling metric value.

6. The system of claim 1, wherein the user plane message comprises a distributed unit control plane message, and wherein the distributed unit control plane message comprises distributed routing information.

7. A method, comprising:
in response to determining, by a system comprising a processor, to setup a mesh connection with a first distributed unit node of first integrated access and backhaul node equipment serving a first user equipment, facilitating, by the system, establishing a device-to-device wireless connection directly between the first distributed unit node of the first integrated access and backhaul node equipment and a second distributed unit node of second integrated access and backhaul node equipment serving a second user equipment; and
facilitating, by the system, transmitting a control message between the first distributed unit node and the second distributed unit node via the device-to-device wireless connection to exchange connection information;
wherein the device-to-device wireless connection is a first connection, and further comprising:
facilitating, by the system, establishing a second connection between a first intermediate device and
a second intermediate device,
wherein the second connection employs a short-range wireless network communication protocol, and
wherein the first intermediate device is communicatively wired to the first distributed unit node.

8. The method of claim 7, wherein the device-to-device wireless connection is a first connection, and further comprising:
facilitating, by the system, establishing a second connection between a first intermediate device and the second distributed unit node, wherein the first intermediate device comprises functions of mobile terminal and is communicatively connected to the first distributed unit node.

9. The method of claim 7, wherein the control message comprises a distributed unit control plane message, and wherein the distributed unit control plane message comprises cross-link interference information.

10. The method of claim 7, wherein the control message comprises a distributed unit control plane message, and wherein the distributed unit control plane message comprises a time division duplexing pattern.

11. The method of claim 7, wherein the control message comprises a distributed unit control plane message, and wherein the distributed unit control plane message comprises a metric value according to a multi-hop scheduling metric.

12. The method of claim 7, wherein the control message comprises a distributed unit control plane message, and wherein the distributed unit control plane message comprises distributed routing information.

13. A non-transitory machine-readable medium, comprising executable instructions that, when executed by a processor, facilitate performance of operations, comprising:
in response to determining to setup a mesh connection with a first distributed unit node of a first integrated access and backhaul node device serving a first group of user equipment, establishing a wireless connection directly between the first distributed unit node of the first integrated access and backhaul node device and a second distributed unit node of a second integrated access and backhaul node device serving a second group of user equipment; and
transmitting a user plane message between the first distributed unit node and the second distributed unit node via the wireless connection to exchange connection information;
wherein the wireless connection is a first wireless connection, and
wherein the operations further comprise:
establishing a second wireless connection between a first intermediate unit and
a second intermediate unit,
wherein the second wireless connection employs a short-range wireless technology, and
the first intermediate unit is communicatively connected to the first distributed unit node.

14. The non-transitory machine-readable medium of claim 13, wherein the wireless connection is a first wireless connection, and wherein the operations further comprise:

establishing a second wireless connection between a first intermediate unit and a second intermediate unit, wherein the first intermediate unit is communicatively connected to the first distributed unit node and the second intermediate unit is communicatively connected to the second distributed unit node.

15. The non-transitory machine-readable medium of claim 13, wherein the wireless connection is a first wireless connection, and wherein the operations further comprise:

establishing a second wireless connection between a first intermediate unit and the second distributed unit node, wherein the first intermediate unit comprises functions of a mobile terminal and is communicatively connected to the first distributed unit node.

16. The non-transitory machine-readable medium of claim 13, wherein the user plane message comprises a distributed unit control plane message, and wherein the distributed unit control plane message comprises cross-link interference information.

17. The non-transitory machine-readable medium of claim 13, wherein the user plane message comprises a distributed unit control plane message, and wherein the distributed unit control plane message comprises a time division duplexing pattern.

\* \* \* \* \*